(12) United States Patent
Auger

(10) Patent No.: US 8,075,045 B2
(45) Date of Patent: Dec. 13, 2011

(54) COVER FOR A VEHICLE

(75) Inventor: Guillaume Auger, Danville (CA)

(73) Assignee: Bombardier Recreational Products Inc., Valcourt (CA)

( * ) Notice: Subject to any disclaimer, the term of this patent is extended or adjusted under 35 U.S.C. 154(b) by 820 days.

(21) Appl. No.: 12/163,370

(22) Filed: Jun. 27, 2008

(65) Prior Publication Data

US 2009/0021043 A1 Jan. 22, 2009

Related U.S. Application Data

(60) Provisional application No. 60/950,966, filed on Jul. 20, 2007.

(51) Int. Cl.
*B60J 11/00* (2006.01)
(52) U.S. Cl. ............... 296/136.07; 296/136.1; 150/166; 52/DIG. 14
(58) Field of Classification Search ............ 296/136.07, 296/136.01, 136.08, 136.1, 136.13; 52/DIG. 14; 150/154, 166, 167
See application file for complete search history.

(56) References Cited

U.S. PATENT DOCUMENTS

| | | | |
|---|---|---|---|
| 1,015,474 A | 1/1912 | Bullock | |
| 3,659,872 A * | 5/1972 | Warner | ......................... 296/78.1 |
| 4,671,203 A | 6/1987 | Sanburg | |
| 5,605,369 A | 2/1997 | Ruiz | |
| 6,129,408 A | 10/2000 | Schultz et al. | |
| 6,209,599 B1 * | 4/2001 | Richardson | .................... 150/167 |
| 6,478,363 B2 * | 11/2002 | Jensen | ..................... 296/136.07 |
| 6,491,335 B1 | 12/2002 | Cohill | |
| 6,964,447 B2 | 11/2005 | McNamee | |
| 6,964,448 B2 | 11/2005 | Morin | |
| 7,125,066 B2 | 10/2006 | McNamee | |

* cited by examiner

*Primary Examiner* — Dennis Pedder
(74) *Attorney, Agent, or Firm* — Osler, Hoskin & Harcourt LLP

(57) ABSTRACT

A family of vehicle cover sections is disclosed, including at least one first cover section comprising a flexible material at least two second cover sections comprising a flexible material. One of the at least two second cover sections is non-permanently connectable to the at least one first cover section to form therewith a first vehicle cover configured to generally fit the contour of at least an upper portion of a first vehicle having a first configuration. Another of the at least two second cover sections is non-permanently connectable to the at least one first cover section to form therewith a second vehicle cover configured to generally fit the contour of at least the upper portion of a second vehicle having a second configuration, the second vehicle cover being removably attachable to the second vehicle. A method of forming a vehicle cover and a cover formed by the method are also disclosed.

14 Claims, 18 Drawing Sheets

COVER FOR A VEHICLE

CROSS-REFERENCE

The present application claims priority to U.S. Provisional Patent Application No. 60/950,966 filed on Jul. 20, 2007, entitled "Cover for a Vehicle", the entirety of which is incorporated herein by reference.

FIELD OF THE INVENTION

The present invention relates to protective covers for a vehicle.

BACKGROUND OF THE INVENTION

Certain vehicles, for example recreational vehicles, are normally covered with protective covers during storage or when they are being towed by a vehicle. The covers provide protection against the elements of nature, such as protecting the colors from fading in the sunlight. The protective covers also keeps snow and dirt thrown from the towing vehicle from contacting the vehicle to prevent surface damage and corrosion of the metal parts.

Accordingly, many different types of covers for recreational vehicles are known, all of which generally provide protection for the vehicle during transportation or storage thereof. Conventionally, covers are designed to snugly fit over the particular vehicle to be covered. Each cover is designed for one vehicle design and thus either does not fit, or provides less protection when placed over another vehicle of different design, even when the two vehicles have similar designs.

Soft, lightweight covers are often used as they can easily be folded up and stored away when not in use. Such conventional covers generally comprise a large upper portion made of a nylon or similarly weatherproof material which is sized and fitted to slide overtop of the entire upper body portion of the vehicle. In the example of a snowmobile, the cover generally covers the forward fairings of the external shell and the seat portion. Typically, the wheels or skis and track of the vehicle are left uncovered by this type of cover, however the cover may alternatively cover one or more of these. A system of straps or attachments were used to keep the cover from blowing off the vehicle.

In some instances, the difference between two vehicle designs is the rear portion of the seat. For example, a first snowmobile could be designed for trail riding with a short seat designed to accommodate the driver alone. A second snowmobile could also be designed for trail riding but have an extended seat with a back rest designed to accommodate a driver and one or more passengers. The front portions of the snowmobiles are substantially the same, as well as the driver's area; they differ toward the rear of the vehicle only. As a result, two separate covers had to be manufactured and stocked in order to have at least one cover for each vehicle readily available. If either the manufacturer or the retailer wishes to have each cover available in different colours, or with optional features such as a vent, the problem is further exacerbated.

U.S. patent application Ser. No. 11/671,694, filed Feb. 6, 2007, the contents of which are incorporated herein by reference, discloses a family of snowmobiles having engine compartments with the same configuration but tunnels of different widths. Therefore, these two snowmobiles with different tunnel widths each require a complete cover, separately designed to fit the contour of both the engine compartment and the tunnel portion of the respective snowmobile, even though their engine compartments have the same shape.

Other recreational vehicles, including ATVs or three-wheeled motorized vehicles such as the Spyder™ three-wheeled vehicle marketed by Bombardier Recreational Products Inc., may present the same problem. For example, a particular model of ATV or three-wheeled motorized vehicle may have a modular component rearward of the driver's seat that can accommodate either a passenger seat or a cargo rack. In each of the two configurations, the vehicle will require a separate cover designed to snugly fit the particular modular rear component.

As can be seen, manufacturers have to produce multiple covers corresponding to each model of vehicle in each of its available configurations, and dealers have had to maintain an inventory of the multiple covers, in order to have an appropriate cover readily available for purchase regardless of the particular vehicle configuration owned by the consumer. A vehicle cover requires a significant amount of material and occupies a significant amount of space even when folded for storage, and an entire cover must be manufactured and stored even when its shape differs from another cover in only one small part. Thus, while these multiple vehicle covers protect the vehicles and are convenient for the vehicle owner, the multiple required designs result in an increase in manufacturing costs and storage costs.

Therefore, there is a need for a vehicle cover having reduced manufacturing cost and occupying reduced storage space.

SUMMARY OF THE INVENTION

It is an object of the present invention to ameliorate at least some of the inconveniences present in the prior art.

It is also an object of the present invention to provide a family of vehicle cover sections that can be combined to form covers that fit a variety of recreational vehicles having different configurations.

One aspect of the present invention provides a family of vehicle cover sections comprising at least one first cover section comprising a flexible material and at least two second cover sections comprising a flexible material. One of the at least two second cover sections is non-permanently connectable to the at least one first cover section to form therewith a first vehicle cover configured to generally fit the contour of at least an upper portion of a first vehicle having a first configuration. The first vehicle cover is removably attachable to the first vehicle. Another of the at least two second cover sections is non-permanently connectable to the at least one first cover section to form therewith a second vehicle cover configured to generally fit the contour of at least the upper portion of a second vehicle having a second configuration. The second vehicle cover is removably attachable to the second vehicle. The second configuration is different from the first configuration.

In a further aspect, the family of vehicle cover sections further comprises at least one third cover section having first and second ends. The first end of the at least one third cover section is non-permanently connectable to the at least one first cover section. The second end of the at least one third cover section is non-permanently connectable to at least one of the at least two second cover sections. The at least one third cover section is disposed between the at least one first cover section and the at least one of the at least two second cover sections when non-permanently connected thereto.

In a further aspect, each of the non-permanent connections is one of a zipper, snaps, Velcro™ and buttons.

In a further aspect, the non-permanent connection is at least one of a zipper, snaps, Velcro™ and buttons.

In a further aspect, the first configuration is a first seat configuration and the second configuration is a second seat configuration.

In a further aspect, the first seat configuration is configured to receive a single rider and the second seat configuration is configured to receive two or more riders.

In a further aspect, the first seat configuration is configured to receive two riders and the second seat configuration is configured to receive three riders.

In a further aspect, the first vehicle comprises handlebars. Each of the at least two second cover sections is connectable to the at least one first cover section at a location disposed rearward of the handlebars when the first vehicle cover is removably attached to the first vehicle.

In a further aspect, the first vehicle is a snowmobile comprising skis. The first vehicle cover generally fits the contour of the skis when the first vehicle cover is removably attached to the first vehicle.

In a further aspect, the first vehicle is a snowmobile comprising skis. The first vehicle cover does not cover the skis when the first vehicle cover is removably attached to the first vehicle.

Another aspect of the present invention provides a method of providing a cover for a vehicle. The cover is removably attachable to the vehicle. The cover is configured to generally fit the contour of at least an upper portion of the vehicle. The method comprises: providing a first cover section comprising a flexible material; selecting a second cover section from a family of second cover sections comprising a flexible material, the family of second cover sections comprising at least two second cover sections having different shapes; and non-permanently connecting the first cover section to the second cover section thereby to form the cover for a vehicle.

In a further aspect, the first cover section is selected from a family of first cover sections. The family of first cover sections comprises at least two first cover sections having different shapes.

In a further aspect, non-permanently connecting the first cover section to the second cover section comprises: providing a third cover section comprising a flexible material, the third cover section having a first end and a second end; non-permanently connecting the first cover section to the first end of the third cover section; and non-permanently connecting the second cover section to the second end of the third cover section, such that the third cover section is disposed between the first cover section and the second cover section.

Another aspect of the present invention provides a vehicle cover comprising a first cover section comprising a flexible material and a second cover section comprising a flexible material. The second cover section is selected from a family of second cover sections. The family of second cover sections comprises at least two second cover sections having different shapes. The second cover section is non-permanently connected to the first cover section.

In a further aspect, the vehicle cover further comprises a third cover section comprising a flexible material. The third cover section has a first end and a second end. The second cover section is non-permanently connected to the first cover section by non-permanently connecting the first cover section to the first end of the third cover section and non-permanently connecting the second cover section to the second end of the third cover section.

In a further aspect, the second cover section is non-permanently connected to the first cover section at a joint. The joint is disposed rearwardly of the handlebars of the vehicle when the vehicle cover is disposed on the vehicle.

In a further aspect, the first cover section comprises: a front wall shaped to generally fit the contour of a front end of a vehicle; a top wall shaped to generally fit the contour of a top of a forward portion of the vehicle, the top wall having a rearward edge; a left side wall shaped to generally fit the contour of at least an upper portion of a left side of the forward portion of the vehicle, the left side wall having a rearward edge; and a right side wall shaped to generally fit the contour of at least an upper portion of a right side of the forward portion of the vehicle, the right side wall having a rearward edge. Each of the at least two second cover sections comprises: a rear wall shaped to generally fit the contour of a rear end of a vehicle; a top wall shaped to generally fit the contour of a top of a rearward portion of the vehicle, the top wall having a forward edge; a left side wall shaped to generally fit the contour of at least an upper portion of a left side of the rearward portion of the vehicle, the left side wall having a forward edge; and a right side wall shaped to generally fit the contour of at least an upper portion of a right side of the rearward portion of the vehicle, the right side wall having a forward edge. The first cover section is non-permanently connected to the selected second cover section by non-permanently connecting the rearward edges of the top wall, left side wall and right side wall of the first cover section respectively to the forward edges of the top wall, left side wall and right side wall of the second cover section.

In a further aspect, a portion of the first cover section is a first seat-covering portion adapted to generally fit the contour of at least a portion of a seat of the vehicle. A portion of the first cover section is a first seat-covering portion adapted to generally fit the contour of at least a portion of a seat of the vehicle. A portion of the selected second cover section is a second seat-covering portion adapted to cover at least a portion of the seat of the vehicle. The first cover section is non-permanently connected to the selected second cover section at an intersection of the first seat covering portion and the second seat-covering portion.

In a further aspect, the selected second cover section further includes at least one strap for removably attaching the vehicle cover to the vehicle.

Another aspect of the present invention provides a vehicle cover comprising a first cover section. The first cover section has: a front wall for covering a front end of a vehicle; a first portion disposed rearwardly of the front wall, the first portion having a first height and a first width; a second portion disposed rearwardly of the first portion, the second portion having a second height greater than the first height and a second width greater than the first width; a third portion disposed rearwardly of the second portion, the third portion having a third height less than the second height and a third width less than the second width; and a first half of a non-permanent fastener disposed rearwardly of the third portion. The vehicle cover comprises a second cover section. The second cover section has: a second half of the non-permanent fastener; a fourth portion disposed rearwardly of the second half of the non-permanent fastener, the fourth portion having a fourth height substantially equal to the third height and a fourth width less than the third width; and a rear wall for covering the rear end of the vehicle. The first cover section is non-permanently connected to the second cover section by connecting the first half of the non-permanent fastener to the second half of the non-permanent fastener, thereby forming the vehicle cover. The third portion and the fourth portion together defining a seat portion adapted to cover the seat of the vehicle.

In a further aspect, the first and second halves of the non-permanent fastener are disposed rearwardly of the handlebars of the vehicle when the vehicle cover is disposed on the vehicle.

For purposes of this application, the term "configuration" means the arrangement of parts. For example, the seating configuration refers to the arrangement and shape of the seat for the driver or rider, and the presence or absence and position of seats for one or more riders as passengers. As a second example, the configuration of a vehicle generally may refer to one or more of the seating configuration, the arrangement of the fairings of the vehicle, the presence, absence, dimensions or shape of other features such as cargo racks, storage boxes, wheels or skis, or any other features that affect the overall external shape of the vehicle.

Embodiments of the present invention each have at least one of the above-mentioned aspects, but do not necessarily have all of them. It should be understood that some aspects of the present invention that have resulted from attaining the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

Vehicle covers in accordance with embodiments of the present invention will be described with respect to their use with snowmobiles, ATVs and three-wheeled motorized vehicles. The present invention can also be applied to other types of vehicles, such as motorcycles.

Figure 1:
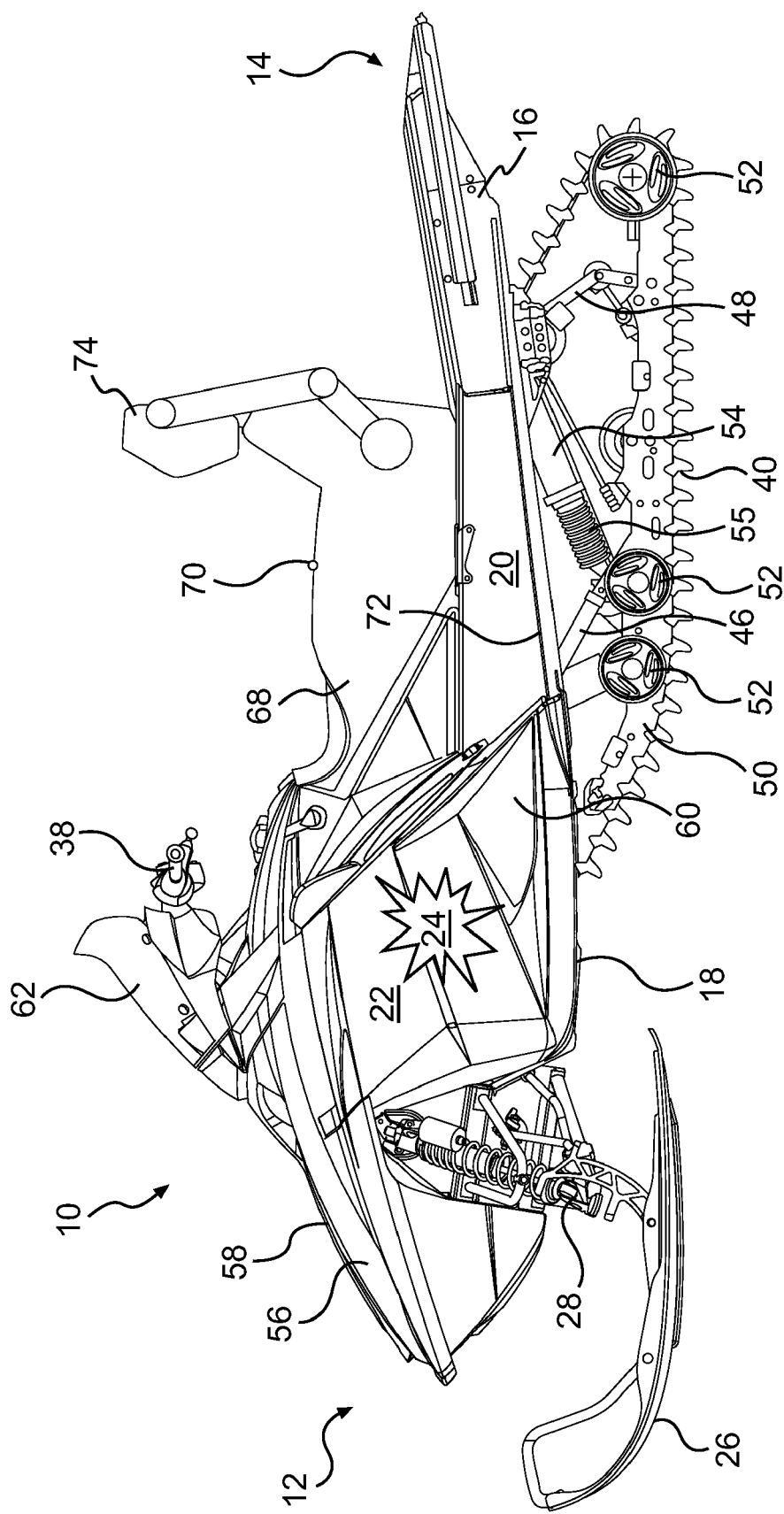
FIG. 1 is a side elevation view of a first snowmobile having a first seating configuration.

There will now be described a family of snowmobiles on which the vehicle cover according to the present invention can be used. FIG. 1 illustrates a snowmobile 10. The snowmobile 10 includes a forward end 12 and a rearward end 14 which are defined consistently with a travel direction of the vehicle. The snowmobile 10 includes a frame 16 comprising an engine cradle portion 18 and a tunnel 20. The tunnel 20 generally consists of one or more pieces of a suitable sheet metal such as steel, stamped into an inverted U-shape. It should be understood that the tunnel 20 may be made with materials other than steel, and that it can be formed into the desired shape by methods other than stamping, without departing from the spirit of the invention. The tunnel 20 is connected to the engine cradle portion 18 and extends rearwardly along the longitudinal axis of the snowmobile 10. While hidden behind a front fairing 22, an engine, not shown, provides motive force for the snowmobile 10.

Two front skis 26 are attached to the front portion of the frame 16 through a front suspension system 28. A handlebar 38 is positioned forward of a seat 168. The handlebar is operatively connected to the skis 26 to steer the skis 26, thereby providing directional control of the snowmobile 10.

An endless drive track 40 is disposed under the tunnel 20 of the frame 16 with the upper portion of the drive track 40 accommodated within the tunnel 20. The endless drive track 40 is operatively connected to the engine 24 through a transmission system (not shown), to provide propulsion to the snowmobile 10. The endless drive track 40 is mounted to the tunnel 20 via a rear suspension assembly 44. The rear suspension assembly 44 includes rear suspension arms 46 and 48, a pair of slide rails 50 and idler wheels 52. Rear suspension arms 46 and 48 connect the slide rails 50 and idler wheels 52 to the tunnel 20 of the frame 16. The slide rails 50 generally position and guide the endless drive track 40, and typically include a sliding lower surface made of polyethylene to reduce contact friction between the slide rails 50 and the drive track 40. The rear suspension assembly 44 also includes one or more shock absorbers 54 which each further include a coil spring 55 surrounding the individual shock absorbers 54.

At the front end 12, the snowmobile 10 includes an external shell consisting of fairings 56 that enclose and protect the engine 24 and transmission. The fairings can be decorated to render the snowmobile 10 more aesthetically pleasing. The fairings 56 include a hood 58 and one or more side panels 60 that can be opened to allow access to the engine 24 and the transmission when this is required, for example, for inspection or maintenance. The side panels 60 can be opened away from the snowmobile 10 along a vertical axis, independently from the hood 58, which pivots forward about a horizontally extending axis. A windshield 62, which may be connected either to the fairings 56, as shown, or directly to the handlebar 38, acts as wind deflector to lessen the force of the air on the driver when the snowmobile is moving.

A straddle-type seat 68 is positioned atop and mounted to the tunnel 20. In the seating configuration shown in FIG. 1, the straddle-type seat 68 provides a seating position 70 for a single driver. Two footrests 72, generally extending outwardly from the tunnel 20, are positioned on either side of the straddle seat 68 to accommodate the driver's feet and provide a rigid platform for the driver to stand on when maneuvering the snowmobile 10. A backrest 74 is also provided for supporting the back of the driver.

Figure 2:
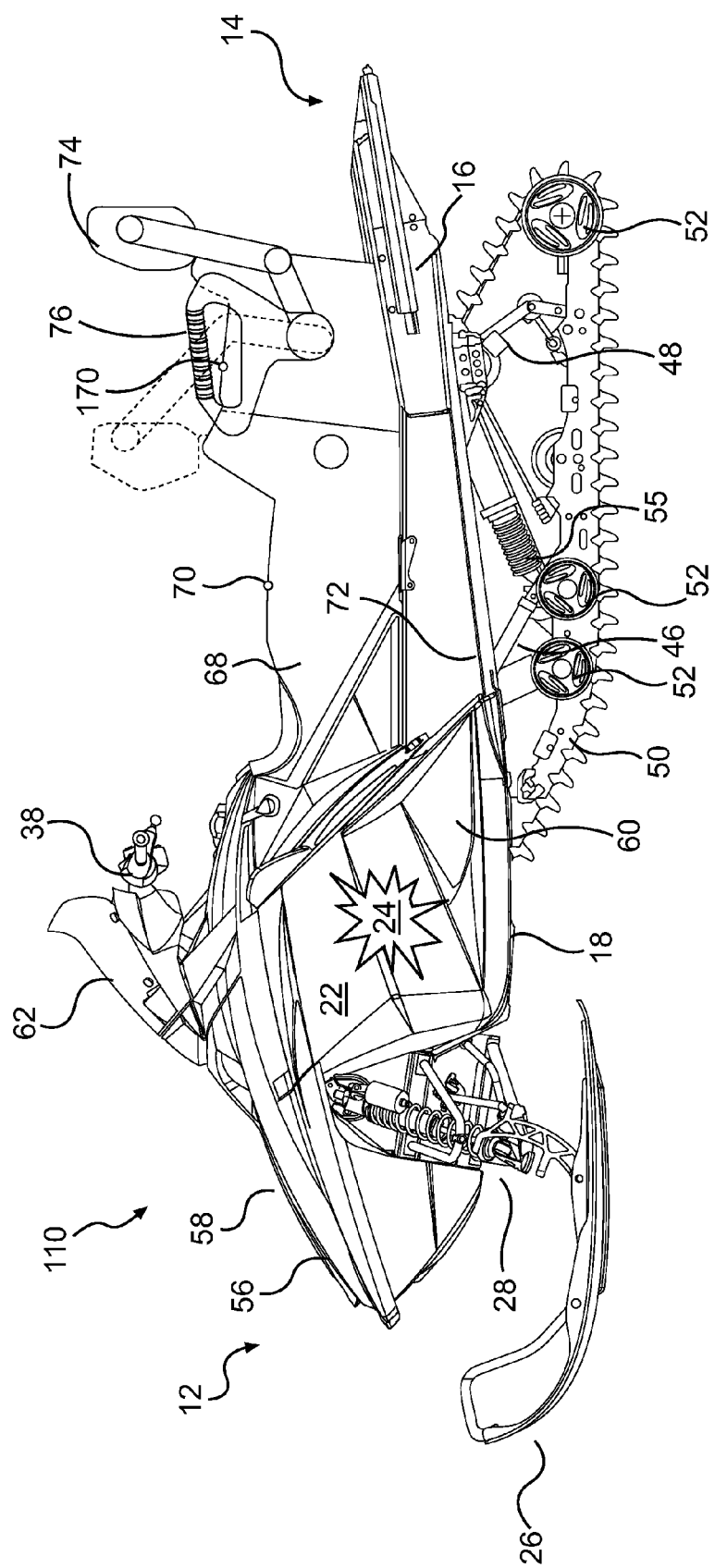
FIG. 2 is a side elevation view of a second snowmobile having a second seating configuration.

FIG. 2 illustrates a second snowmobile 110. The snowmobile 110 differs from the snowmobile 10 of FIG. 1 only in its seating configuration. The straddle-type seat 168 of snowmobile 110 has a first seating position 70 for the driver, and a second seating position 170 for a first passenger. The backrest 74 is positioned rearward of the seating position 170 to support the back of the first passenger, and grab handles 76 are provided for the first passenger to grip while seated on the seating position 170. The remaining features of snowmobile 110 are the same as those of the snowmobile 10 of FIG. 1, and are labelled with the same reference numbers. Therefore, these will not be described in further detail.

Figure 3:
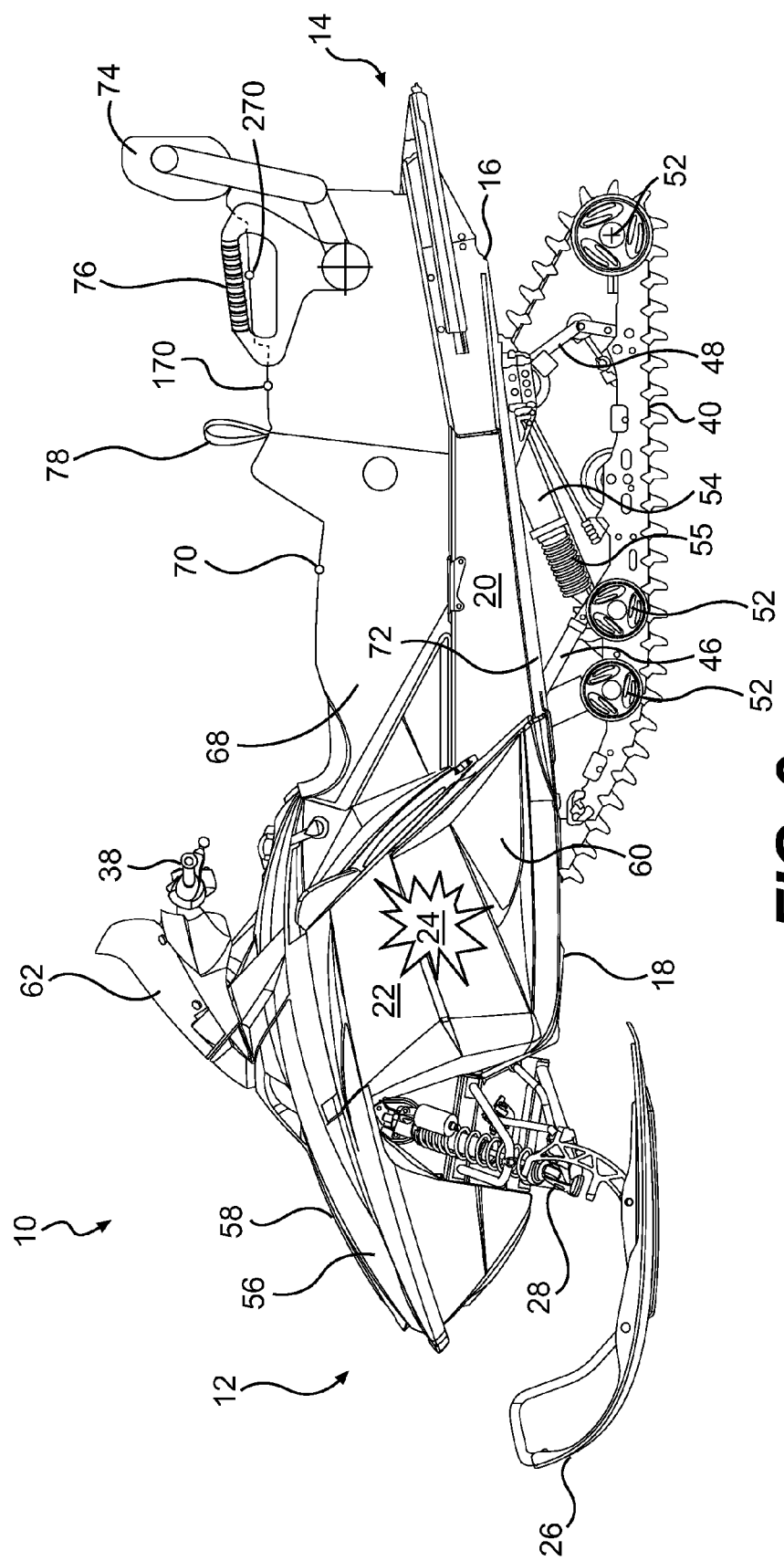
FIG. 3 is a side elevation view of a third snowmobile having a third seating configuration.

FIG. 3 illustrates a third snowmobile 210. The snowmobile 210 differs from the snowmobiles 10 and 110 only in its seating configuration. The straddle-type seat 268 of the snowmobile 210 has a first seating position 70 for the driver, a second seating position 170 for a first passenger, and a third seating position 270 for a second passenger. The backrest 74 is positioned rearward of the third seating position 270 to support the back of the second passenger, the grab handles 76 are positioned to be gripped by the second passenger while seated on the third seating position 270, and a looped strap 78 is provided for the first passenger to grip while seated on the seating position 170. The remaining features of snowmobile 210 are the same as those of snowmobile 10, and are labelled with the same reference numbers. Therefore, these will not be described in further detail.

Figure 5A:
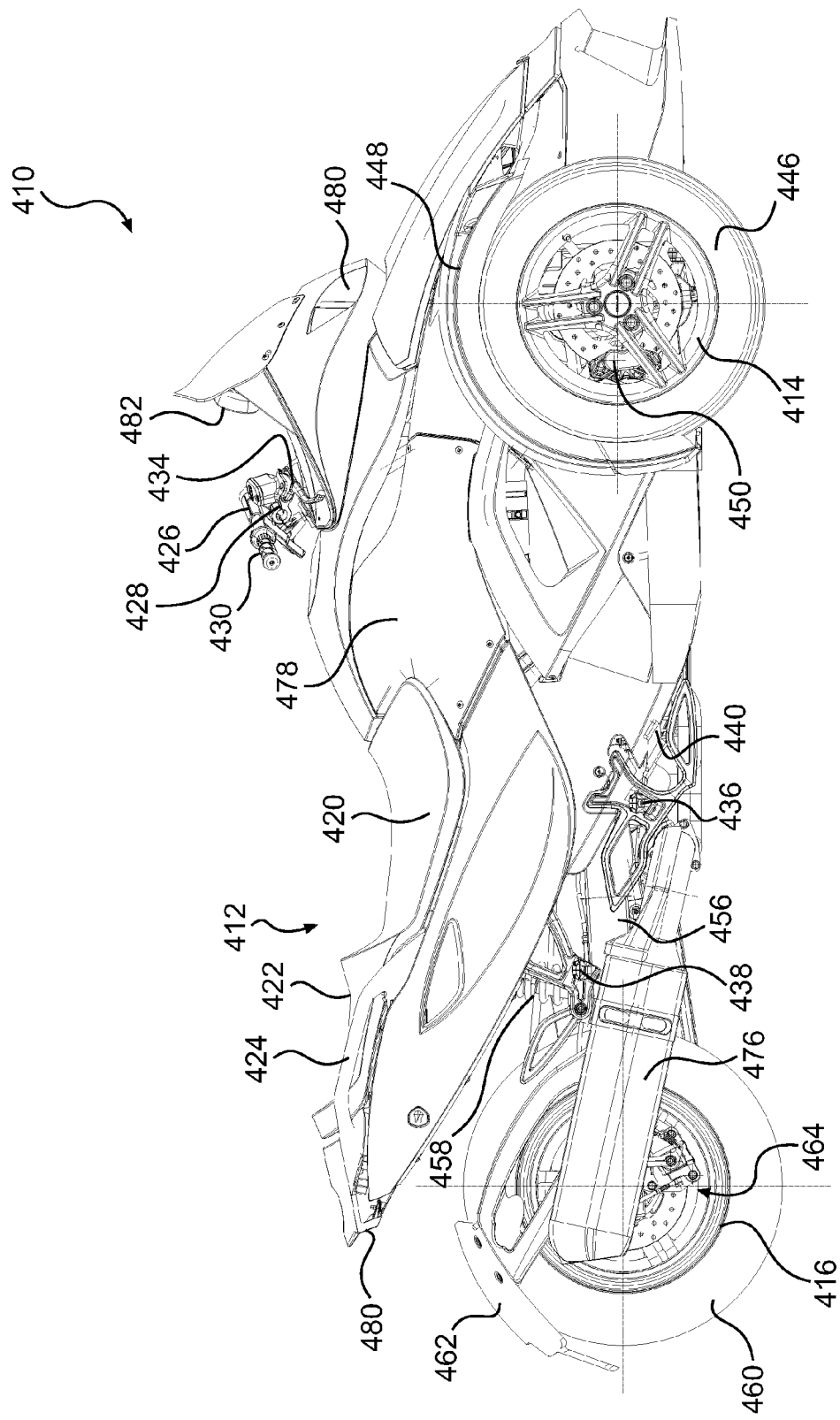
FIG. 5A is a side elevation view of a first three-wheeled motorized vehicle having a first seating configuration.

There will now be described a family of three-wheeled motorized vehicles on which the vehicle cover according to the present invention can be used. FIG. 5A shows a first three-wheeled motorized vehicle 410. The vehicle 410 has a straddle seat 412 located at least partially rearwardly of a center of the vehicle 410 and disposed along the longitudinal centerline thereof. The straddle seat 412 has a first portion 420 for accommodating a driver, and a second portion 422 for accommodating a passenger behind the driver. The second portion 422 is higher than the first portion 420 to permit the passenger to see in front of the vehicle 410 over the driver. A pair of handles 424 are provided on either side of the second portion 422 for the passenger to hold onto. It is contemplated that the straddle seat 412 could be disposed at a different longitudinal location depending on the particular ergonomics of the vehicle 410. It is also contemplated that the straddle seat 412 could only have the first portion 420 for the driver.

A steering assembly is disposed forwardly of the straddle seat 412 to allow a driver to steer the two front wheels 414. The steering assembly has handlebars 426 connected to a steering column 428. The steering column 428 is connected to the two front wheels 414, such that turning the handlebars 426 turns the wheels 414. The handlebars 426 are provided with handles 430 for the driver to hold. The right handle 430 can twist and acts as the throttle controller for the engine (not shown). It is contemplated that the throttle could also be controlled by a separate lever disposed near one of the handles 430. A brake actuator, in the form of a hand brake lever 434, is provided near the right handle 430 for braking the vehicle 410.

A pair of driver foot pegs 436 are provided on either sides of the vehicle 410 below the first portion 420 of the straddle seat 412 for a driver to rest his feet thereon. Similarly a pair of passenger foot pegs 438 are provided on either side of the vehicle 410 below the second portion 422 of the straddle seat 412 for a passenger to rest his feet thereon. Another brake actuator, in the form of a foot brake lever 440, is provided on a right side of the vehicle 410 below the first portion 420 of the straddle seat 412 for braking the vehicle 410.

Each of the two front wheels 414 is mounted to the frame (not labelled) of the vehicle 410 via a front suspension (not shown) in a known manner. Each of the two front wheels 414 has a tire 446 thereon which is suitable for road use. The tires 446 are preferably inflated to a pressure between 138 kPa and 345 kPa. A fairing 448 is disposed over each tire 446 to protect the driver from dirt and water which can be lifted by the tire 446 while it is rolling. Each of the two front wheels 414 is also provided with a brake 450.

The rear wheel 416 is mounted to the frame via a swing arm 456. The swing arm 456 preferably has two arms pivotally mounted at a front thereof to the frame and between which the rear wheel 416 is rotatably mounted at the rear of the two arms. A shock absorber 458 is disposed between the swing arm 456 and the frame 442. The rear wheel 416 has a tire 460 thereon which is suitable for road use. Preferably, the tire 460 is wider than the tires 446. It is contemplated that the tire 460 could have a smaller width or the same width as the tires 446. It is also contemplated that the rear wheel 416 could have two or more tires disposed next to each other thereon and still be considered a single rear wheel. The tire 460 is preferably inflated to a pressure between 138 kPa and 345 kPa. A fairing 462 is disposed over the tire 460 to protect the driver from dirt and water which can be lifted by the tire 460 while it is rolling. The rear wheel 416 is provided with a brake 464. Power is transmitted from the engine to the rear wheel 416 via a belt drive (not shown) or any other suitable means.

A vehicle body 478 is attached to the frame in order to protect the components mounted to the frame and to make the vehicle 410 aesthetically pleasing. Components necessary to make vehicle 410 suitable for road use, such as lights 480 and a rear view mirror 482, are mounted to the vehicle body 478.

Figure 5B:
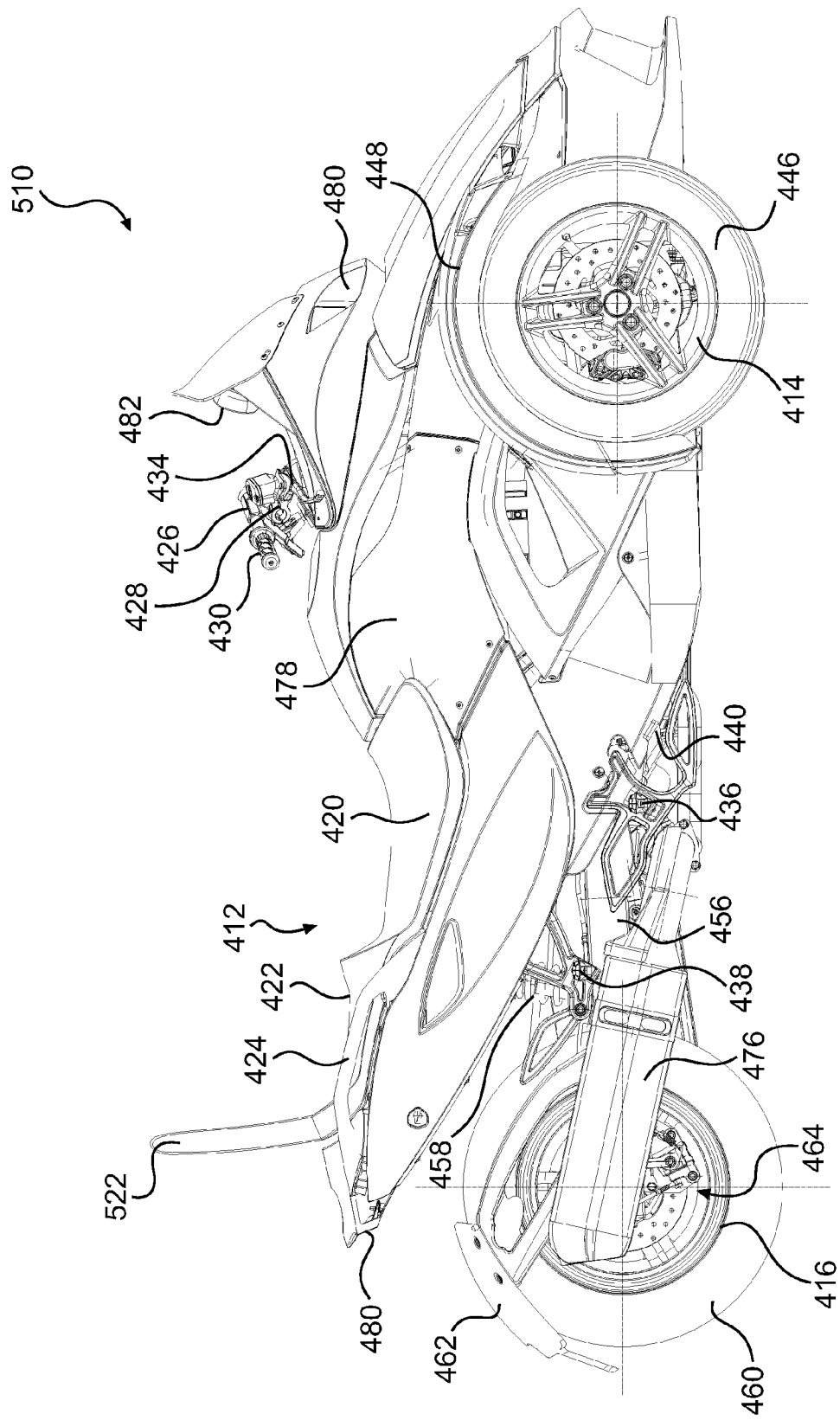
FIG. 5B is a side elevation view of a second three-wheeled motorized vehicle having a second seating configuration.

FIG. 5B shows a second three-wheeled motorized vehicle 510. The second three-wheeled motorized vehicle 510 differs from the three-wheeled motorized vehicle 410 of FIG. 5A only in the addition of a backrest 522 positioned rearward of the second portion 422 of the seat 412, to support the back of the passenger. The remaining features of the second three-wheeled vehicle 510 are the same as those of the three-wheeled vehicle 410 of FIG. 5A, and are labelled with the same reference numbers. Therefore, these will not be described in further detail.

Figure 6:
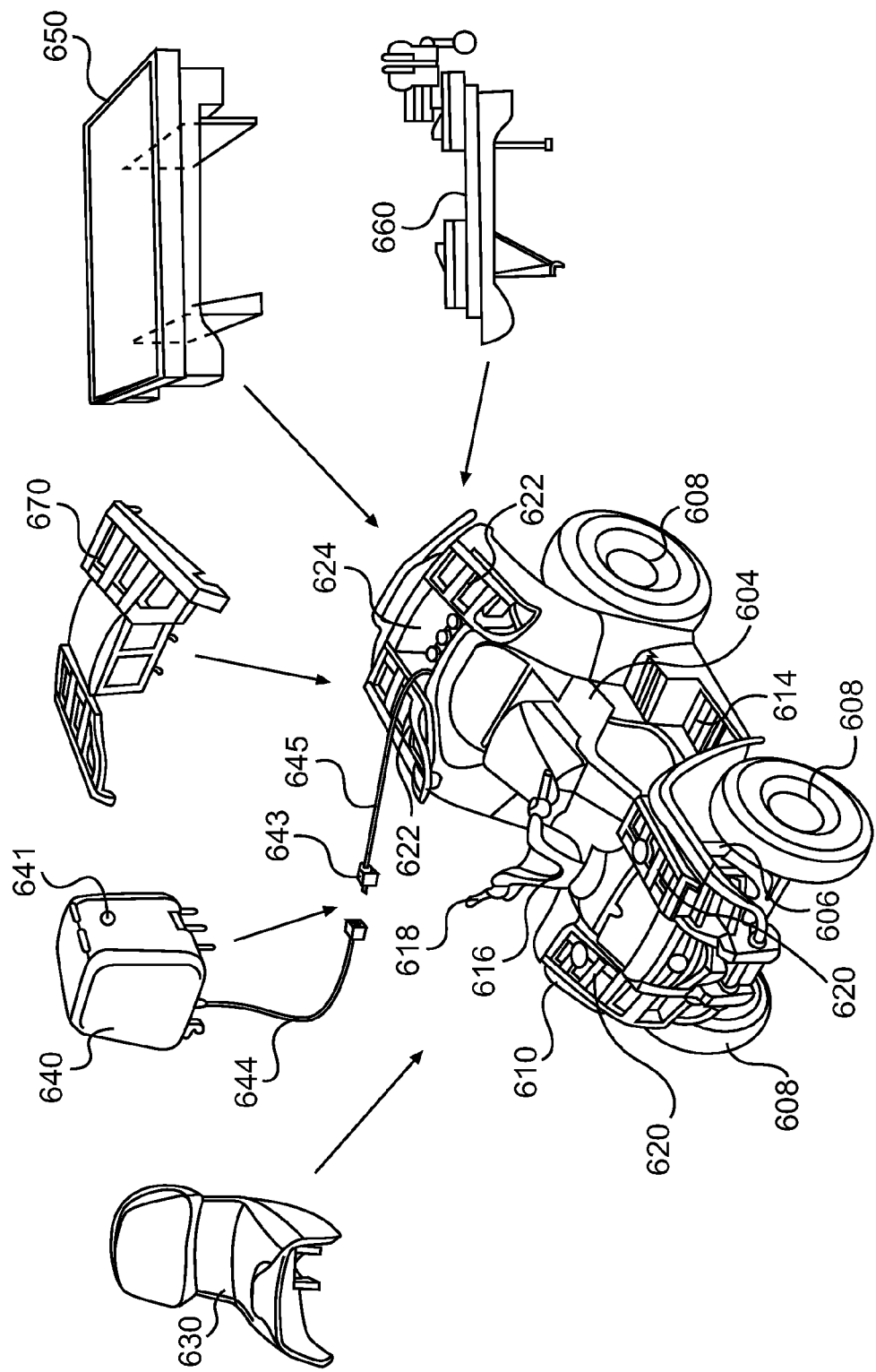
FIG. 6 is an isometric view of an ATV with a variety of interchangeable modular sub-assemblies.

There will now be described a family of ATVs on which the vehicle cover according to the present invention can be used. FIG. 6 shows an ATV 610. The ATV 610 has a frame (not shown) which supports a body 604. The frame rotatably supports front and rear suspension systems 606 to which are mounted front and rear wheels 608, in a manner well known in the art. The wheel preferably have low-pressure balloon tires (i.e, between 1.5 and 4 psi)

A driver seat 612 is mounted to the frame generally above an engine (not shown). The driver seat 612 can support a driver in a straddle position with a leg on each side of driver seat. Footrests 614 are mounted laterally to the sides of the ATV 610. Connected to the frame is a steering assembly 616, including handlebars 618, for steering the ATV 610.

Primary cargo storage on the ATV 610 is provided by front cargo racks 620 and rear cargo racks 622 mounted to the body 604 substantially over the axles of the wheels 608. The front cargo rack 620 may have one or more portions over the fenders of the front wheels 608. Likewise, the rear cargo rack 622 may have one or more portions over the fenders of the rear wheels 608. Optionally, the front cargo rack 620 and rear cargo rack 622 may be integrally formed with the body 604.

The ATV has a receptacle 624 mounted to a rear portion of the vehicle permitting a variety of different modular components, to be interchangeably connected to receptacle at the rear portion of the vehicle, as will be described below.

The receptacle 624 is adapted to receive and releasably engage a modular component in the manner described in U.S. patent application Ser. No. 10/796,371, filed Mar. 8, 2004, which is incorporated herein by reference in its entirety. The modular component may be interchangeably mounted on the ATV 610, and can be removed by an owner and replaced by a modular component of a different type whenever a different feature is desired or deemed useful. For example, the modular component may be a rear passenger seat 630, a cargo container 640, a flatbed 650, a work bench 660 (with or without the illustrated vise grip), or a rear cargo rack 670. The modular component may be electrically and electronically connected to the ATV 610 via a wire 644 connected to the modular component, a connector 642, 643 adapted for being disconnected when the modular component is removed and a wire 645 connected to the vehicle's electrical circuit, for example to power a brake light 641 mounted on the modular component.

For each of the vehicle types discussed above, it should be understood that each of the configurations requires a vehicle cover having a different shape, despite the many similarities between the vehicles. For example, the snowmobiles 10, 110 and 210 require three different covers, even though the vehicles themselves are substantially the same shape except for the respective seating configurations. In particular, the front portions of the snowmobiles 10, 110 and 210 are the same.

Therefore, in accordance with an embodiment of the present invention, a plurality of front and rear vehicle cover sections are provided as will be discussed in greater detail below. A vehicle cover for a particular vehicle is formed by selecting the appropriate front vehicle cover section to snugly fit the front portion of the vehicle, selecting the appropriate rear vehicle cover section to snugly fit the rear portion of the vehicle, and fastening together the selected sections with a non-permanent fastener to form a vehicle cover that snugly fits the contour of the entire vehicle.

The front and rear cover portions are made of nylon but could be made of any other suitable weatherproof material. They are lightweight and flexible so they can be easily folded up and stored away when not in use.

FIGS. 4A-4H illustrate schematically how a family of snowmobile cover sections in accordance with one embodiment of the invention can be interconnected to provide snugly fitting covers for a number of different configurations of snowmobiles. It will be understood that the same principles can be applied in an analogous manner to covers for the various configurations of three-wheeled motorized vehicles and ATVs previously described.

Referring generally to FIGS. 4A-4H, a snowmobile cover fitted to a particular snowmobile is formed by selecting an appropriate front cover section corresponding to the configuration of the front portion of the snowmobile, selecting an appropriate rear cover section corresponding to the configuration of the rear portion of the snowmobile, and fastening the selected front cover section to the selected rear cover section at a joint. The construction of the joint will be described in further detail below.

Figure 4A:
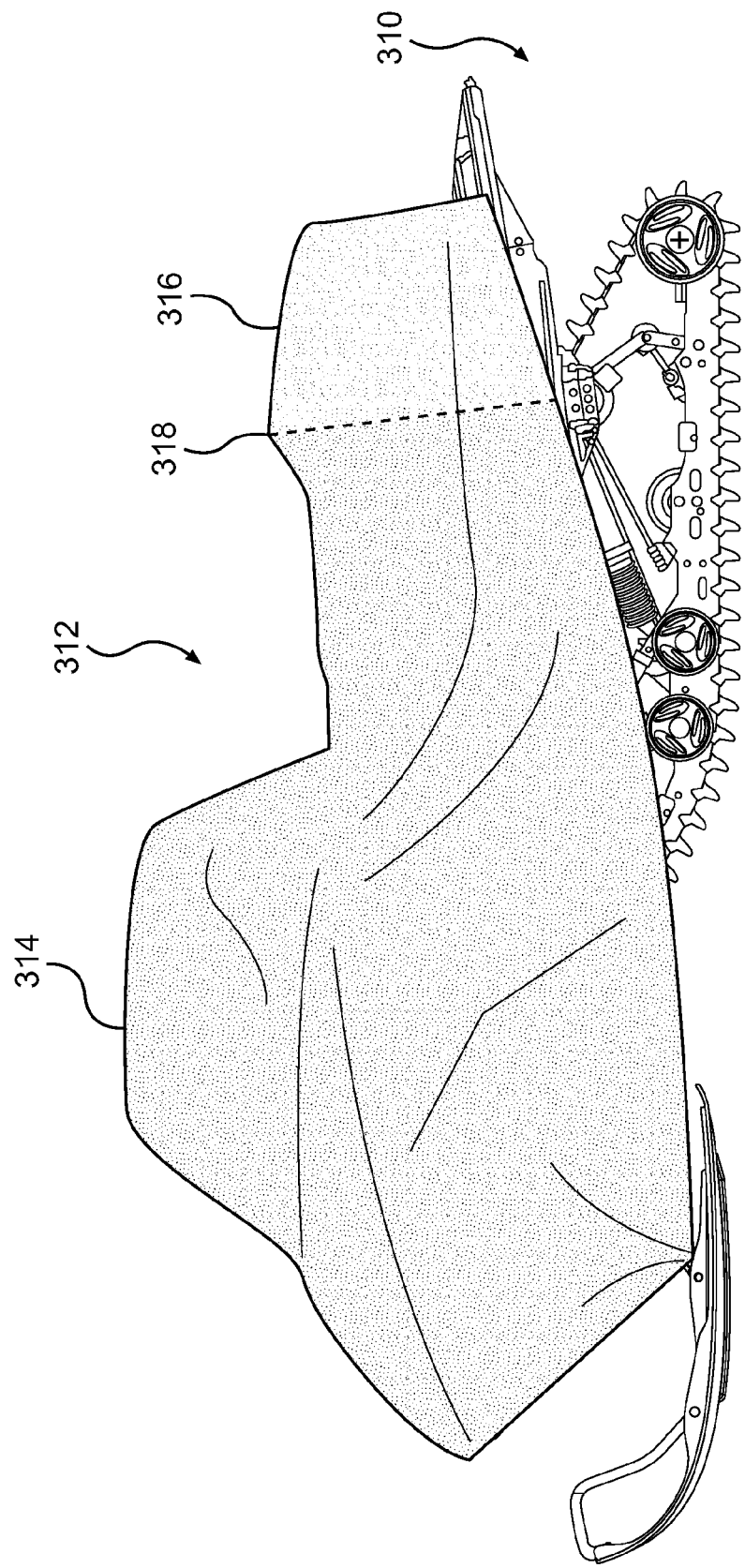
FIGS. 4A through 4H are schematic illustrations of vehicle covers according to an embodiment of the present invention.

Referring to FIG. 4A, the snowmobile 310 has a front configuration A and a rear configuration A'. It is therefore fitted with a cover 312, formed by selecting the front cover section 314, corresponding to front configuration A, selecting the rear cover section 316, corresponding to rear configuration A', and joining them together at the joint 318.

Figure 4B:
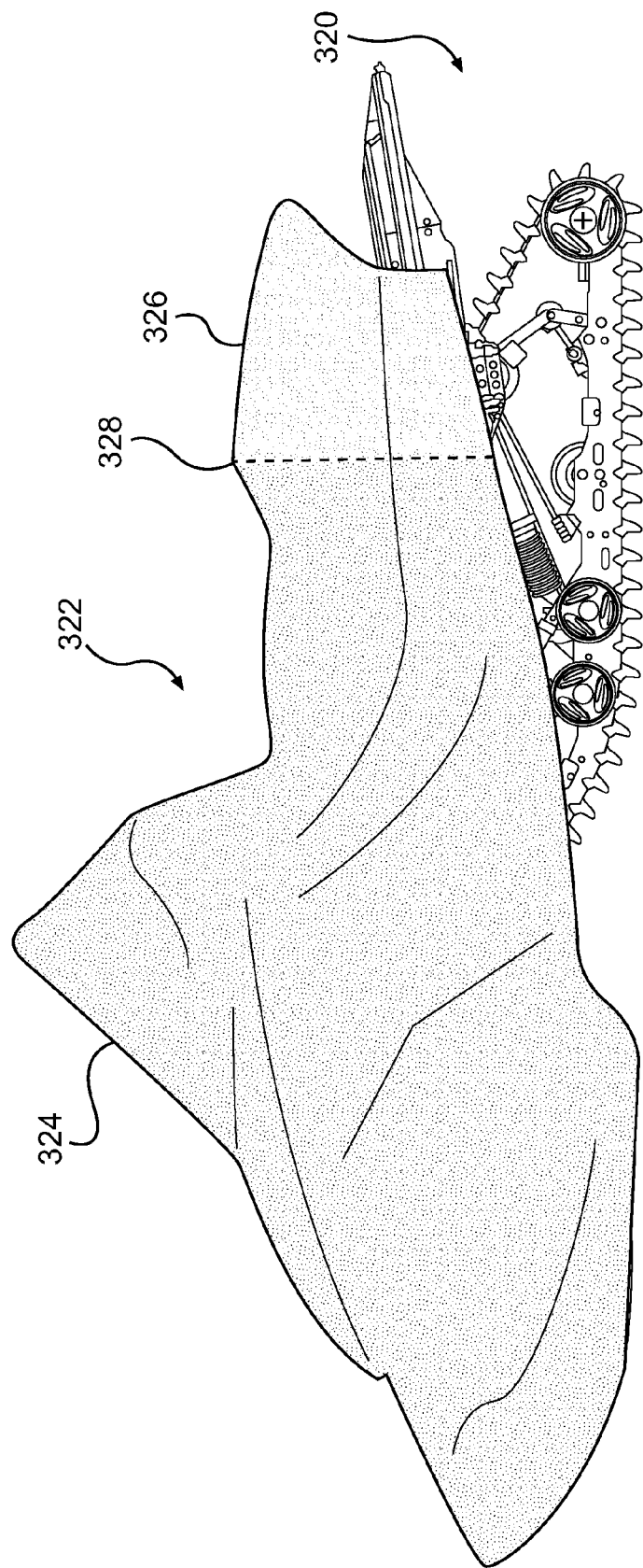

Referring to FIG. 4B, the snowmobile 320 has a front configuration B and a rear configuration B'. It is therefore fitted with a cover 322, formed by selecting the front cover section 324, corresponding to front configuration B, selecting the rear cover section 326, corresponding to rear configuration B', and joining them together at the joint 328.

Figure 4C:
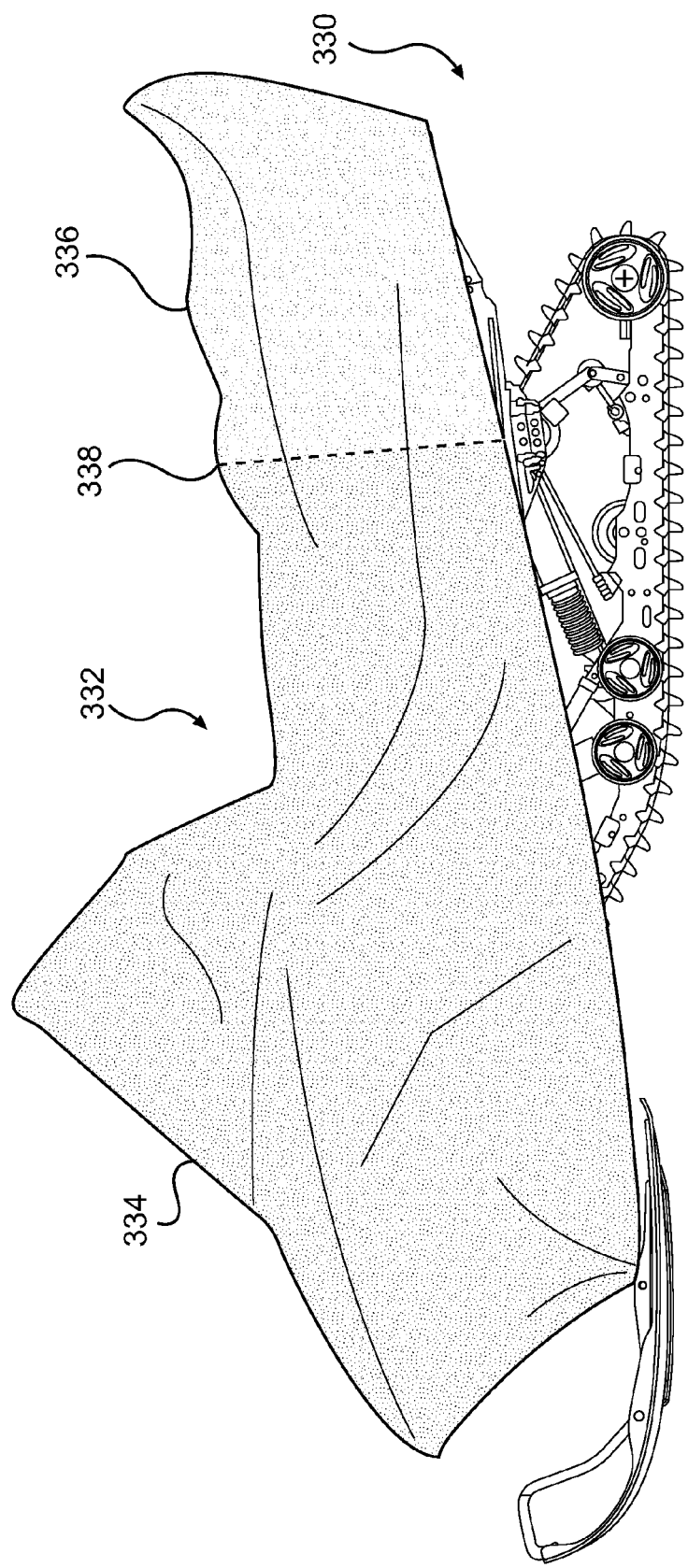

Referring to FIG. 4C, the snowmobile 330 has a front configuration C and a rear configuration C'. It is therefore fitted with a cover 332, formed by selecting the front cover section 334, corresponding to front configuration C, selecting the rear cover section 336, corresponding to rear configuration C', and joining them together at the joint 338.

Figure 4D:
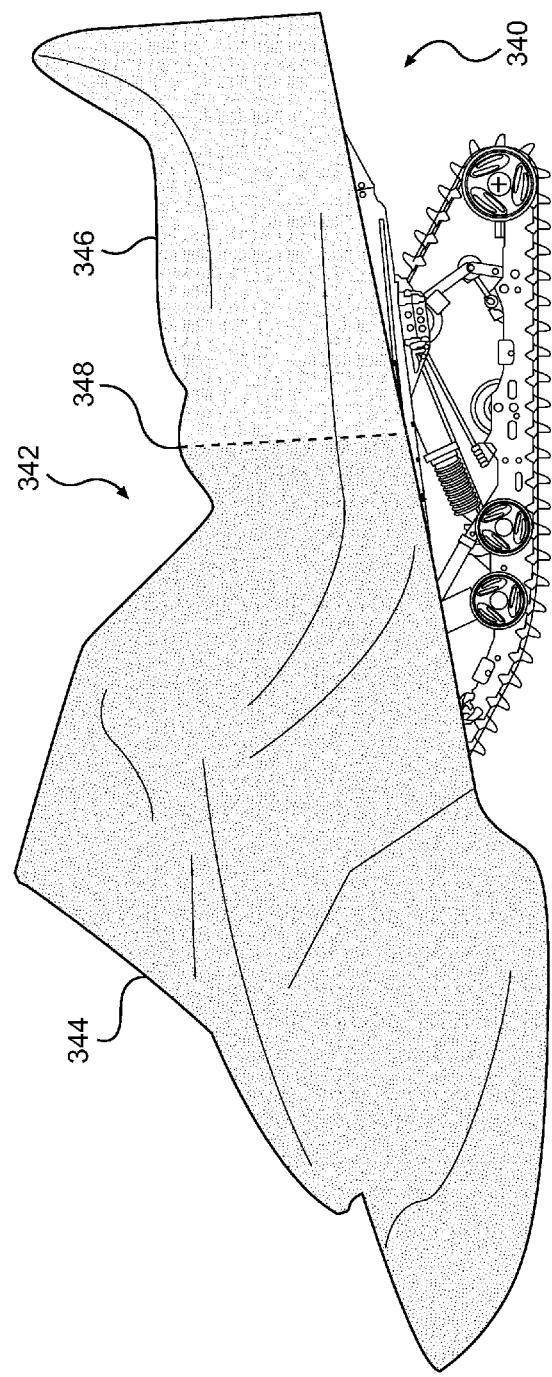

Referring to FIG. 4D, the snowmobile 340 has a front configuration D and a rear configuration D'. It is therefore fitted with a cover 342, formed by selecting the front cover section 344, corresponding to front configuration D, selecting the rear cover section 346, corresponding to rear configuration D', and joining them together at the joint 348.

Figure 4E:
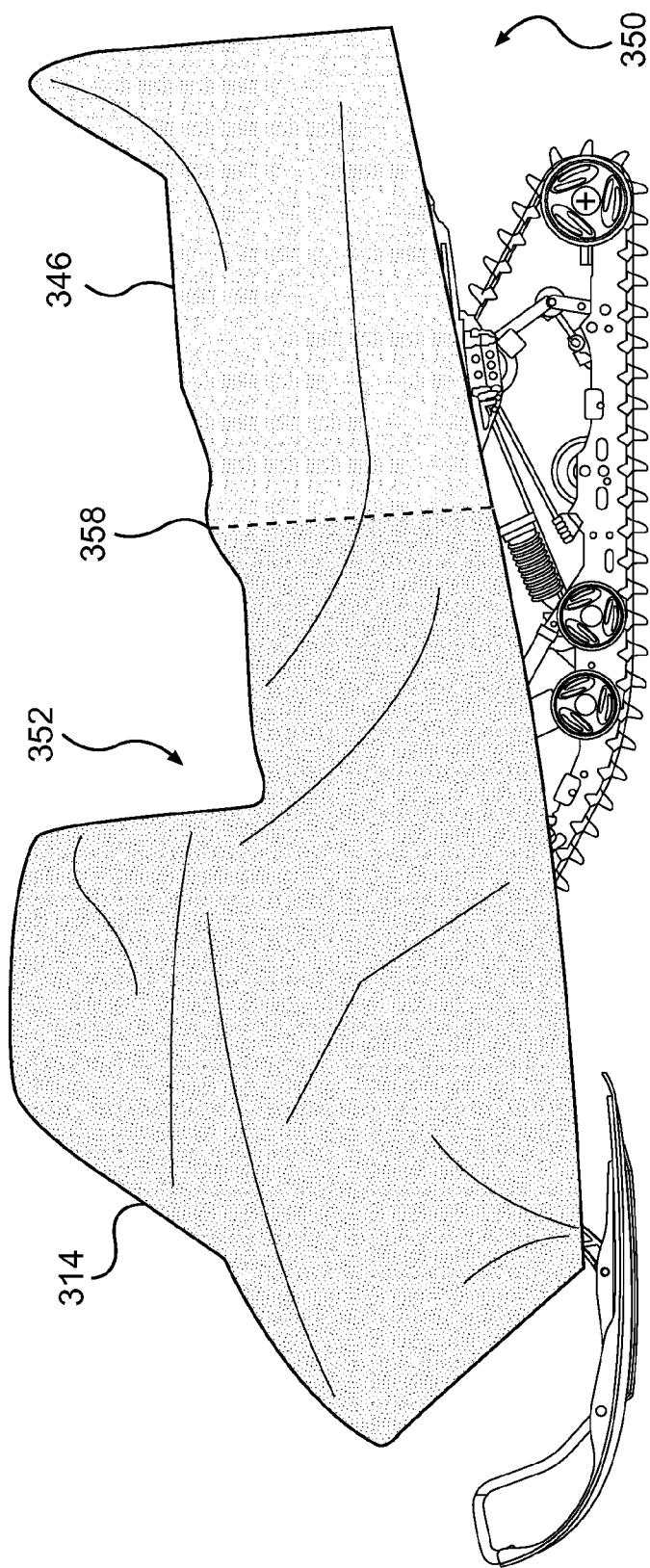

Referring to FIG. 4E, the snowmobile 350 has the same front configuration A as the snowmobile 310 of FIG. 4A and the same rear configuration D' as the snowmobile 340 of FIG. 4D. It is therefore fitted with a cover 352, formed by selecting the front cover section 314 used in cover 312 of FIG. 4A, selecting the rear cover section 346 used in cover 342 of FIG. 4D, and joining them together at the joint 358.

Figure 4F:
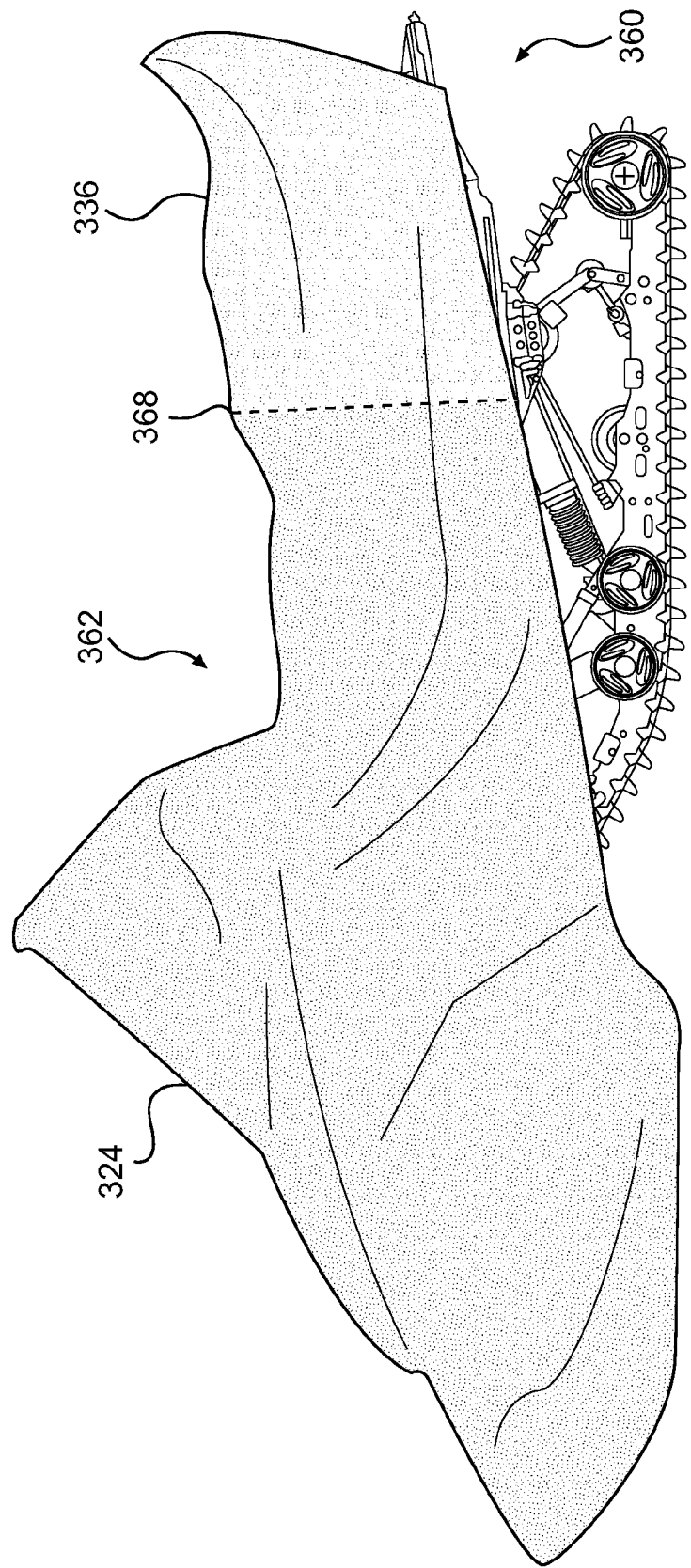

Referring to FIG. 4F, the snowmobile 360 has the same front configuration B as the snowmobile 320 of FIG. 4B and the same rear configuration C' as the snowmobile 330 of FIG. 4C. It is therefore fitted with a cover 362, formed by selecting the front cover section 324 used in cover 322 of FIG. 4B, selecting the rear cover section 336 used in cover 332 of FIG. 4C, and joining them together at the joint 368.

Figure 4G:
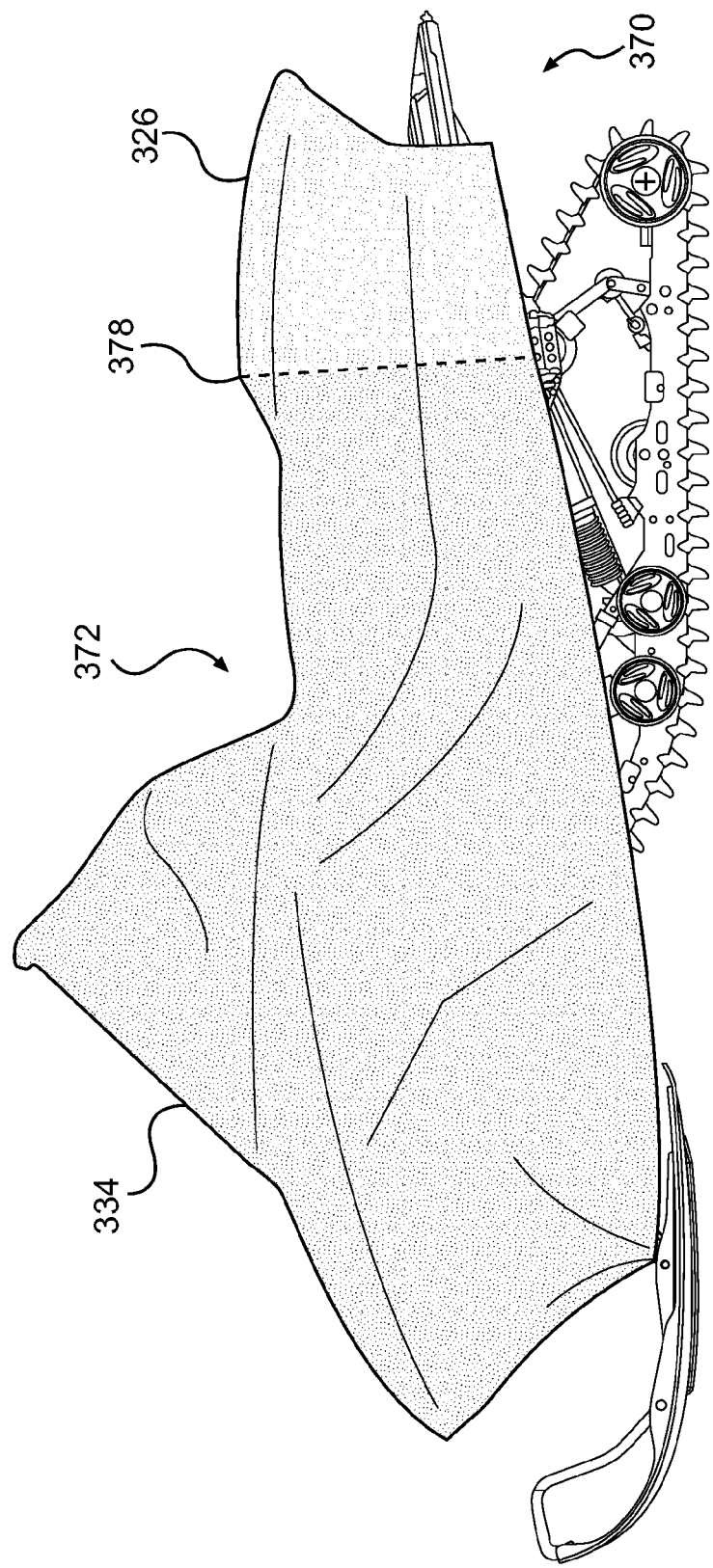

Referring to FIG. 4G, the snowmobile 370 has the same front configuration C as the snowmobile 330 of FIG. 4C and the same rear configuration B' as the snowmobile 320 of FIG. 4B. It is therefore fitted with a cover 372, formed by selecting the front cover section 334 used in cover 332 of FIG. 4C, selecting the rear cover section 326 used in cover 322 of FIG. 4B, and joining them together at the joint 378.

Figure 4H:
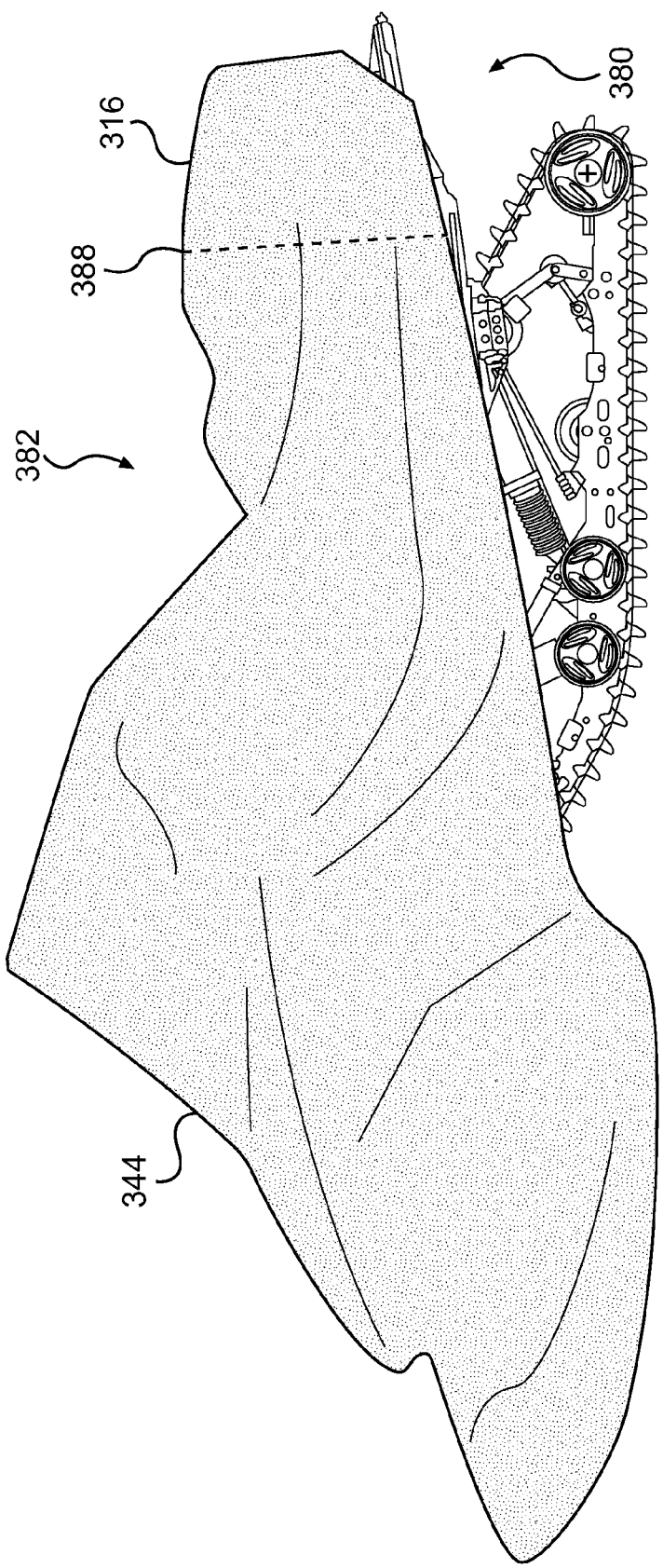

Referring to FIG. 4H, the snowmobile 380 has the same front configuration D as the snowmobile 340 of FIG. 4D and the same rear configuration A' as the snowmobile 310 of FIG. 4A. It is therefore fitted with a cover 382, formed by selecting the front cover section 344 used in cover 342 of FIG. 4D, selecting the rear cover section 316 used in cover 312 of FIG. 4A, and joining them together at the joint 388.

Figure 7:
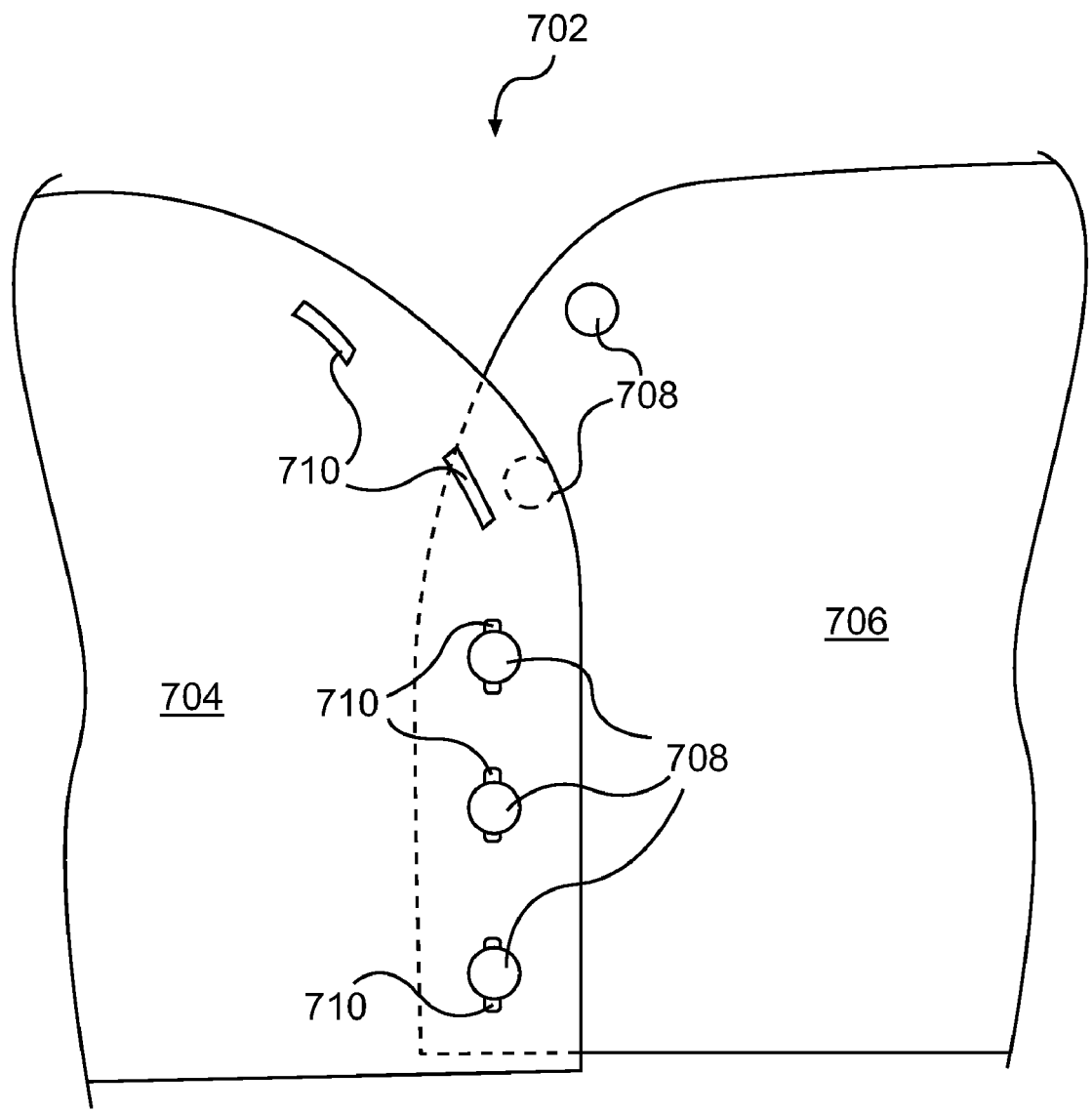
FIG. 7 is an elevation view of a joint between two vehicle cover sections according to an embodiment of the present invention.

The joint between the front and rear cover sections may be fastened by a zipper, snaps, buttons, Velcro™ or any other suitable fastener. It is contemplated that more than one type of fastener may be used on the same joint. For example, the selected front and rear cover sections may be fastened together by a zipper, buttons or snaps, which may be covered by a flap of material fastened with Velcro™. Referring to FIG. 7, a joint 702 is shown between a front cover section 704 and a rear cover section 706. In this example, the joint is fastened using buttons. The first half of the fastener, the buttons 708, is provided on the rear cover section 706. The second half of the fastener, the button holes 710, is provided in the front cover section 704. Because the nature of the joint 702 results in the front and rear cover sections overlapping, the joint 702 is arranged such that the front cover section 704 is disposed outwardly of the rear cover section 706 when the cover is placed on the vehicle. If the rear cover section 706 were disposed outwardly of the front cover section 704, it would be possible for air to be caught by the joint 702 and potentially become trapped inside the vehicle cover when the vehicle is being towed on a trailer with the vehicle oriented in a forward direction.

The construction of the front cover sections 314, 324, 334, 344 and the rear cover sections 316, 326, 336, 346 will now be described. The front and rear cover sections are sized and fitted so that when they are joined the resulting vehicle cover can slide over the top of the entire upper body portion of the snowmobile, generally covering the forward fairings of the external shell and the rear seat portion. The skis and track may be left uncovered by this type of cover, as seen in FIGS. 4A, 4C, 4E and 4G, or the front section of the cover may extend downward to cover the skis as seen in FIGS. 4B, 4D, 4F and 4H. Similarly, for an ATV or a three-wheeled motorized vehicle, the cover may optionally cover the wheels of the vehicle or leave them uncovered.

Figure 9A:
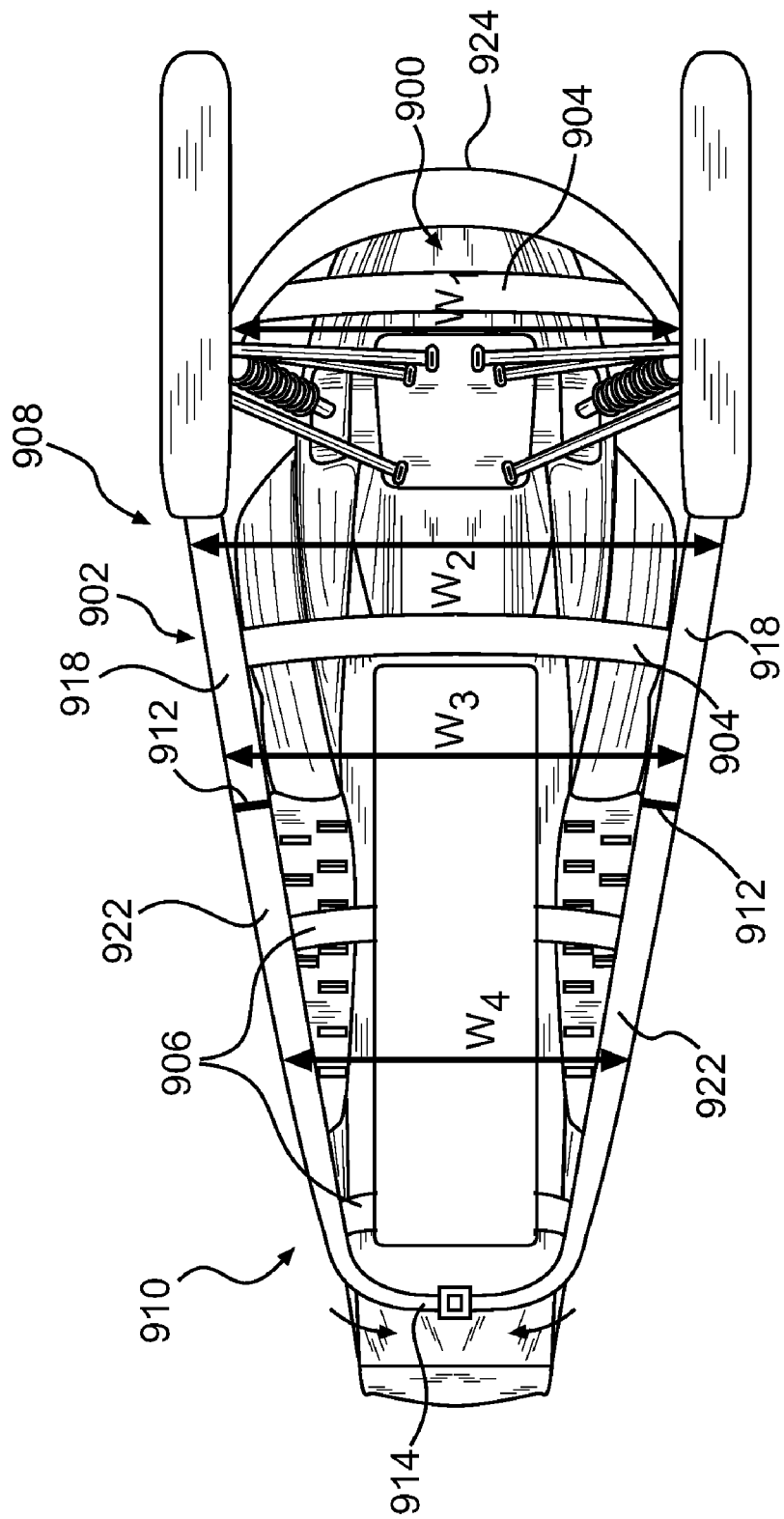
FIG. 9A is a bottom plan view of a snowmobile having a cover fastened thereto.
Figure 9B:
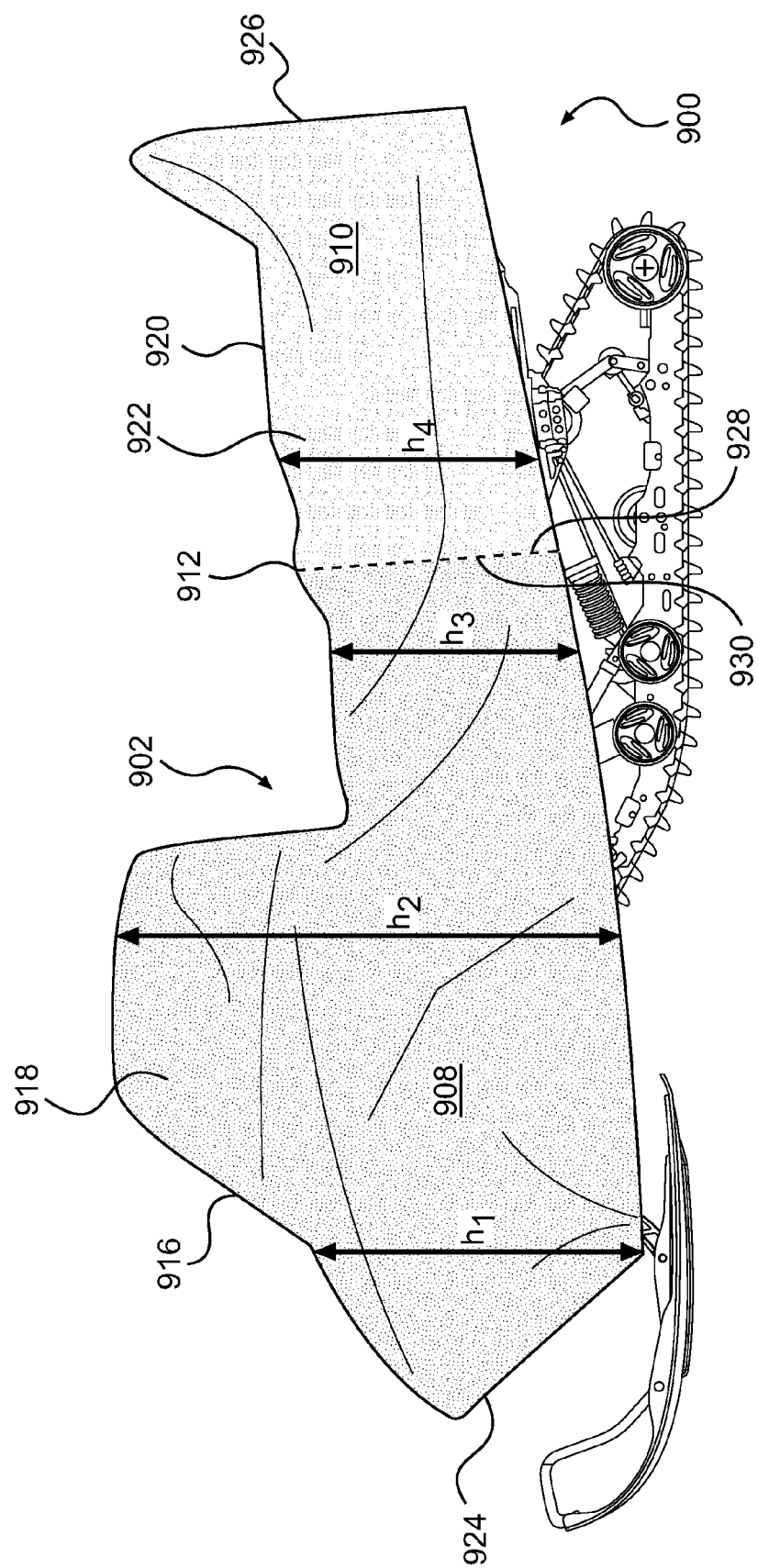
FIG. 9B is a side elevation view of a snowmobile having a cover fastened thereto.

Referring to FIGS. 9A and 9B, the snowmobile cover and some of its features have been renumbered for ease of understanding and to illustrate the general applicability of the present invention. The snowmobile cover is discussed above, including a number of different combinations of front and rear cover sections. FIGS. 9A and 9B illustrate one particular combination of front and rear cover sections, but it should be understood that the same principles apply generally to any combination.

Referring to FIGS. 9A and 9B, each front cover section has a top wall 916 and left and right side walls 918 to generally follow the contour of the snowmobile 900 and provide a snug fit for the forward portion of the snowmobile 900. Each rear cover section has a top wall 920 and left and right side walls 922 to generally follow the contour of the snowmobile and provide a snug fit for the rearward portion of the snowmobile. In addition, each front cover section has a front wall 924 and each rear cover section has a rear wall 926, to generally follow the contour of the respective end of the snowmobile. Referring also to FIGS. 1-3 generally, it should be understood that some parts of the snowmobile 900 are larger than others. This necessitates that some parts of the snowmobile cover 902 be larger than others in order to snugly fit on the snowmobile 900, as shown in FIGS. 9A and 9B. The front wall 924 may be pointed or blunt according to the shape of the particular snowmobile. Disposed rearwardly of the front wall 924 is a first portion of the snowmobile cover 902 having a first height $h_1$ and a first width $w_1$ adapted to snugly fit over the front fairings of the snowmobile 900. The snowmobile cover 900 then slopes generally upwardly and rearwardly to a second portion having a second height $h_2$ and a second width $w_2$, respectively larger than the first height $h_1$ and a first width $w_1$, adapted to snugly fit over the windshield and handlebars of the snowmobile 900. The snowmobile cover 902 then slopes generally downwardly and rearwardly to a third portion having a third height $h_3$ and a third width $w_3$, respectively smaller than the second height $h_2$ and the second width $w_2$, adapted to snugly fit over a part of the seat of the snowmobile 900. Disposed rearwardly of the third portion is a fourth portion having a fourth height $h_4$ approximately equal to the third height $h_3$, and a fourth width $w_4$, slightly smaller than the third width $w_3$, adapted to snugly fit over a part of the seat of the snowmobile 900. Disposed rearwardly of the fourth portion is the rear wall 926, which is contoured to snugly fit over the rearward end of the snowmobile 900. It should be understood that the same principle can be applied to covers for other types of vehicles, such as all-terrain vehicles (ATVs), and three-wheeled motorized vehicles, in which case the cover would have the appropriate shape corresponding to the features of the vehicle being covered, to ensure a snug fit.

The joint 912 between the front and rear cover sections is formed by joining the rearward edge 928 of the front cover section 908 to the forward edge 930 of the rear cover section 910, as will be described in greater detail below. The joint 912 is situated along the seat, rearwardly of the handlebars and forwardly of the rear of the snowmobile, between the third portion and the fourth portion of the snowmobile cover 902. Because the seat of the snowmobile 900 has generally smaller dimensions than the front fairings, windshield and handlebars, the length of the joint 912 required to fasten the front cover section 908 to the rear cover section 910 is correspondingly shorter, resulting in reduced cost of manufacture and increased convenience in fastening and unfastening the respective cover sections compared to, for example, a longer joint situated along the windshield portion of the snowmobile. It is contemplated that the joint may alternatively be located forwardly or rearwardly of the illustrated location, without departing from the scope of the invention. It should be understood that the same principle can be applied to covers for other types of vehicles, such as all-terrain vehicles (ATVs), and three-wheeled motorized vehicles, in which case the joint would be situated along a part of the vehicle that is generally narrower or smaller than other parts of the vehicle, such as the seat portion, to provide a joint of reduced length.

Thus, using only four different front cover sections 314, 324, 334, 344, and only four different rear cover sections 316, 326, 336, 346, snugly fitting covers can be provided for snowmobiles having the eight different configurations shown. It should be understood that as many as 16 total permutations are possible with four front cover sections and four rear cover sections, thus properly fitted covers can be provided for as many as 16 different vehicle configurations using the same four front cover sections and four rear cover sections. It should also be understood that the number of different front and rear cover sections shown here is merely exemplary, and the invention may be practiced with more or fewer front cover sections and rear cover sections.

In addition, it should be understood that the differences in vehicle configuration between the vehicles are not limited to the seating configurations, but can include the presence or absence of a cargo rack or storage box rearward of the rear seat, different front fairing designs, or any combination of these.

Figure 8:
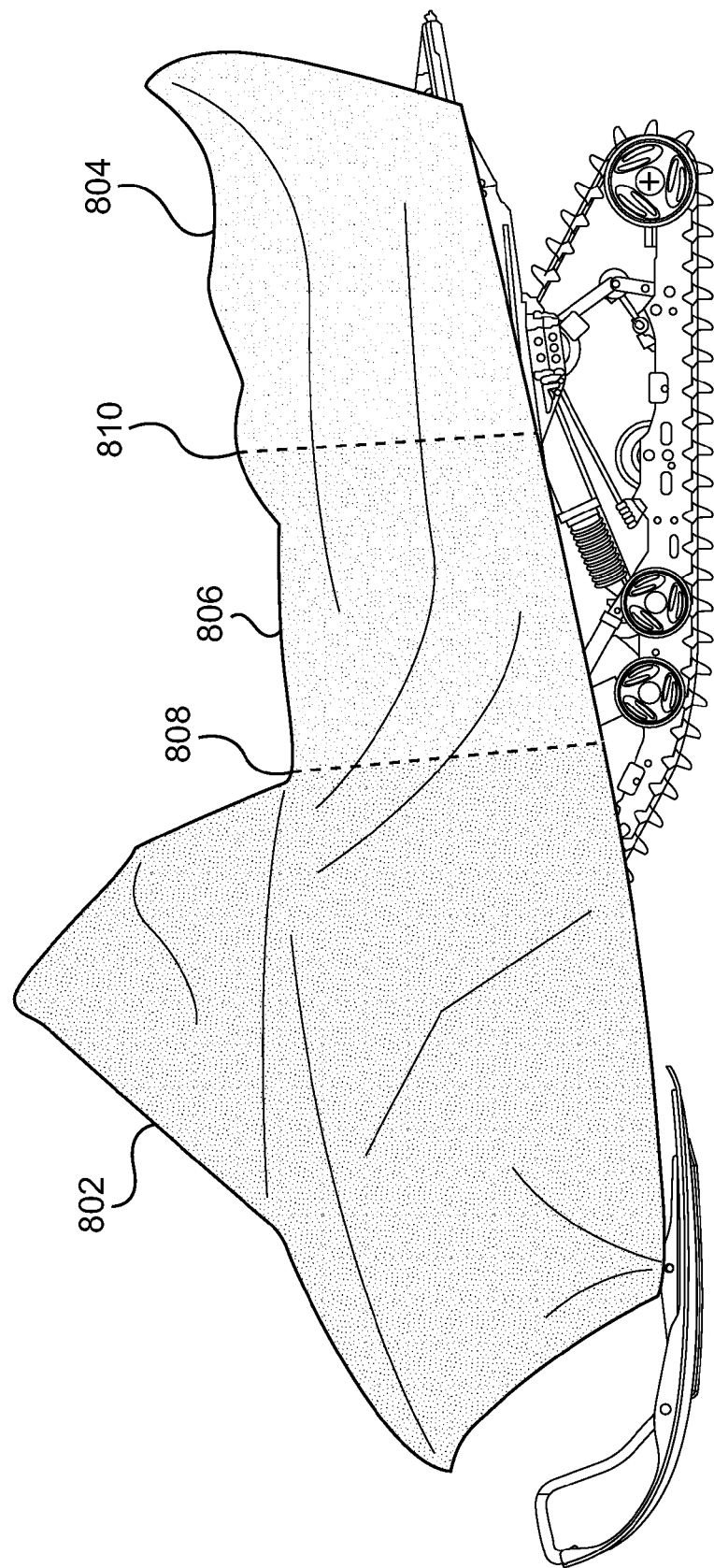
FIG. 8 is a schematic illustration of a vehicle cover according to another embodiment of the present invention.

Referring to FIG. 8, the front cover section 802 may be connected to the rear cover section 804 by connecting a middle cover section 806 therebetween, for example if the only or primary difference between two vehicle configurations is the length of the vehicle. Thus a first joint 808 is formed between the front cover section 802 and the middle cover section 806, and a second joint 810 is formed between the middle cover section 806 and the rear cover section 804. Both joints 808 and 810 may employ one or more suitable fasteners such as a zipper, snaps, buttons, Velcro™ or any other suitable fastener in the manner described above. It is also contemplated that the joints may employ different fasteners, for example snaps may be used for joint 808 and a zipper may be used for joint 810. In this manner, the proper orientation of the middle cover section 806 is assured, because only the front edge of the middle section 806 can be successfully fastened to the front cover section 802 and only the rear edge of the middle section 806 can be fastened to the rear cover section 804.

Referring to FIGS. 9A and 9B, the snowmobile cover 902 may be secured to the snowmobile 900 by lateral straps 904, 906 which extend from one side of the opening in the snowmobile cover 902, and are adapted to transversely extend beneath the snowmobile 900 for fastening engagement with the snowmobile cover 902 on the opposite side of the snowmobile 900. The cover may have as many as three or four straps 904, 906. One or more straps 904 may be attached to the front cover section 908, forward of the joint 912, and one or more straps 906 may be attached to the rear cover section 910, rearward of the joint 912, to ensure that the snowmobile cover 902 is adequately secured to the snowmobile 900. This method of securing a cover to a snowmobile is described in greater detail in U.S. Pat. No. 6,964,448, which is incorporated herein by reference in its entirety.

The cover 902 may alternatively or additionally be secured to the snowmobile 900 by a strap 914 which extends around the perimeter of the snowmobile cover 902, having ends which meet at a point, such as the rear of the snowmobile 902, for fastening together. The strap can then be drawn taut to hold the perimeter of the snowmobile cover 902 as close to the snowmobile 900 as possible, thereby preventing wind or snow from entering the snowmobile cover 902 or blowing the snowmobile cover 902 off the snowmobile 900. This method of securing a cover to a snowmobile is described in U.S. Pat. No. 6,964,448.

The cover may alternatively be secured to the vehicle in the following manner, described in U.S. Pat. No. 6,964,448. A single continuous fastening strap extends around at least the rear half of the perimeter of the lower opening in the cover. Each of the free ends of the fastening strap has a length which permits it to be crossed under the snowmobile and fastened to the lower lip on a lateral side thereof opposite from that of the strap opening from which the free end projects.

It should be understood that the cover can be attached to the vehicle by these or any other suitable means without departing from the spirit of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A family of vehicle cover sections comprising:
   at least one first cover section comprising:
      a front wall shaped to generally fit a contour of a front end of first and second vehicles;
      a top wall shaped to generally fit a contour of a top of a forward portion of the first and second vehicles, the top wall having a rearward edge;
      a left side wall shaped to generally fit a contour of at least an upper portion of a left side of the forward portion of the first and second vehicles, the left side wall having a rearward edge;
      a right side wall shaped to generally fit a contour of at least an upper portion of a right side of the forward portion of the first and second vehicles, the right side rearward edge;
      the front wall, the top wall, the left side wall and the right side wall of the at least one first cover section being made of flexible material,
   the at least one first cover section being adapted to cover at least handlebars of the first and second vehicles; and
   a first one of at least two second cover sections comprising:
      a rear wall shaped to generally fit a contour of a rear end of the first vehicle;
      a top wall shaped to generally fit a contour of a top of a rearward portion of the first vehicle, the top wall having a forward edge;
      a left side wall shaped to generally fit a contour of at least an upper portion of a left side of the rearward portion of the first vehicle, the left side wall having a forward edge;
      a right side wall shaped to generally fit a contour of at least an upper portion of a right side of the rearward portion of the first vehicle, the right side wall having a forward edge,
      the front wall, the top wall, the left side wall and the right side wall of the first one of the at least two second cover sections being made of flexible material, and
   the first one of the at least two second cover sections being non-permanently connected to the at least one first cover section by non-permanently connecting the rearward edges of the top wall, left side wall and right side wall of the at least one first cover section to the forward edges of the top wall, left side wall and right side wall of the first one of the at least two second cover sections respectively,
      when connected to each other the at least one cover section and the first one of the at least two cover sections forming a first vehicle cover configured to generally fit a contour of at least an upper portion of the first vehicle, the first vehicle having a first configuration, the first vehicle cover being removably attachable to the first vehicle;
   the second one of the at least two second cover sections comprising:
      a rear wall shaped to generally fit a contour of a rear end of the second vehicle;
      a top wall shaped to generally fit a contour of a top of a rearward portion of the second vehicle, the top wall having a forward edge;
      a left side wall shaped to generally fit a contour of at least an upper portion of a left side of the rearward portion of the second vehicle, the left side wall having a forward edge;
      a right side wall shaped to generally fit a contour of at least an upper portion of a right side of the rearward portion of the second vehicle, the right side wall having a forward edge,
      the front wall, the top wall, the left side wall and the right side wall of the second one of the at least two second cover sections being made of flexible material, and
   the second one of the at least two second cover sections being non-permanently connected to the at least one first cover section by non-permanently connecting the rearward edges of the top wall, left side wall and right side wall of the at least one first cover section to the forward edges of the top wall, left side wall and right side wall of the second one of the at least two second cover sections respectively,
      when connected to each other the at least one cover section and the second one of the at least two cover sections forming a second vehicle cover configured to generally fit a contour of at least an upper portion of the second vehicle, the second vehicle having a second configuration, the second configuration being different from the first configuration, the second vehicle cover being removably attachable to the second vehicle.

2. The family of vehicle cover sections of claim 1, further comprising at least one third cover section having:
   a top wall shaped to generally fit the contour of the top of the rearward portion of at least one of the first and second vehicles, the top wall having a forward edge and a rearward edge;
   a left side wall shaped to generally fit the contour of at least the upper portion of the left side of the rearward portion of the at least one of the first and second vehicles, the left side wall having a forward edge and a rearward edge;
   a right side wall shaped to generally fit the contour of at least the upper portion of the right side of the rearward portion of the at least one of the first and second vehicles, the right side wall having a forward edge and a rearward edge,
   the front wall, the top wall, the left side wall and the right side wall of the at least one third cover sections being made of flexible material,
   wherein the forward edges of the front wall, the top wall, the left side wall and the right side wall of the at least one third cover section are non-permanently connectable to the rearward edges of the front wall, the top wall, the left side wall and the right side wall of the at least one first cover section, and wherein the rearward edges of the front wall, the top wall, the left side wall and the right side wall of the at least one third cover section are non-permanently connectable to the forward edges of the front wall, the top wall, the left side wall and the right side wall of at least one of the at least two second cover sections for covering a corresponding one of the first and second vehicles, such that the at least one third cover section is disposed between the at least one first cover section and the at least one of the at least two second cover sections when non-permanently connected thereto.

3. The family of vehicle cover sections of claim 2, wherein each of the non-permanent connections is one of a zipper, snaps, Velcro™ and buttons.

4. The family of vehicle cover sections of claim 1, wherein the first configuration is a first seat configuration and the second configuration is a second seat configuration.

5. The family of vehicle cover sections of claim 4, wherein the first seat configuration is configured to receive a single rider and the second seat configuration is configured to receive two or more riders.

6. The family of vehicle cover sections of claim 4, wherein the first seat configuration is configured to receive two riders and the second seat configuration is configured to receive three riders.

7. The family of vehicle cover sections of claim 1, wherein each of the at least two second cover sections is connectable to the at least one first cover section at a location disposed rearward of the handlebars when either one of the first and second vehicle covers cover is removably attached to a corresponding one of the first and second vehicle.

8. The family of vehicle cover sections of claim 1, wherein the first and second vehicles are snowmobiles comprising skis, and wherein the at least one first cover section generally fits a contour of the skis when either one of the first and second vehicle covers are removably attached to a corresponding one of the first and second vehicle.

9. The family of vehicle cover sections of claim 1, wherein the first and second vehicles are snowmobiles comprising skis, and wherein the at least one first cover section does not cover the skis when either one of the first and second vehicle covers are removably attached to a corresponding one of the first and second vehicle.

10. A method of providing a cover for a vehicle, the cover being removably attachable to the vehicle, the cover being configured to generally fit a contour of at least an upper portion of the vehicle, the method comprising:
providing a first cover section comprising:
a front wall shaped to generally fit a contour of a front end of the vehicle;
a top wall shaped to generally fit a contour of a top of a forward portion of the vehicle, the top wall having a rearward edge
a left side wall shaped to generally fit a contour of at least an upper portion of a left side of the forward portion of the vehicle, the left side wall having a rearward edge;
a right side wall shaped to generally fit a contour of at least an upper portion of a right side of the forward portion of the vehicle, the right side wall having rearward edge,
the front wall, the top wall, the left side wall and the right side wall of the first cover section being made of flexible material,
the first cover section being adapted to cover at least handlebars of the vehicle;
selecting a second cover section from a family of second cover sections, the family of second cover sections comprising at least two second cover sections having different shapes, the family of second cover sections being non-permanently connectable to the first cover section to form different covers adapted for covering at least upper portions of different vehicles, a selected one of the at least two second cover sections comprising:
a rear wall shaped to generally fit a contour of a rear end of the vehicle;
a top wall shaped to generally fit a contour of a top of a rearward portion of the vehicle, the top wall having a forward edge;
a left side wall shaped to generally fit a contour of at least an upper portion of a left side of the rearward portion of the vehicle, the left side wall having a forward edge;
a right side wall shaped to generally fit a contour of at least an upper portion of a right side of the rearward portion of the vehicle, the right side wall having a forward edge,
the front wall, the top wall, the left side wall and the right side wall of the selected second cover section being made of flexible material; and
non-permanently connecting the first cover section to the selected second cover section thereby forming the cover for the vehicle.

11. The method of claim 10, wherein providing the first cover section comprises selecting the first cover section from a family of first cover sections; the family of first cover sections comprising at least two first cover sections having different shapes.

12. The method of claim 11, wherein non-permanently connecting the first cover section to the second cover section comprises:
providing a third cover section having:
a top wall shaped to generally fit the contour of the top of the rearward portion of the vehicle, the top wall having a forward edge and a rearward edge;
a left side wall shaped to generally fit the contour of at least the upper portion of the left side of the rearward portion of the vehicle, the left side wall having forward edge and a rearward edge;
a right side wall shaped to generally fit the contour of at least the upper portion of the right side of the rearward portion of the vehicle, the right side wall having a forward edge and a rearward edge,
the front wall, the top wall, the left side wall and the right side wall of the third cover section being made of flexible material,
such that the at least one third cover section is disposed between the at-least one first cover section and the at least one of the at least two second cover sections when non-permanently connected thereto;
non-permanently connecting the rearward edges of the front wall, the top wall, the left side wall and the right side wall of the first cover section to the forward edges of the third cover section; and
non-permanently connecting the forward edges of the front wall, the top wall, the left side wall and the right side wall of the second cover section to the rearward edges of the third cover section, thereby forming the cover for the vehicle.

13. The vehicle cover of claim 10, wherein non-permanently connecting the first cover section to the second cover section includes non-permanently connecting the rearward edges of the front wall, the top wall, the left side wall and the right side wall of the first cover section to the forward edges of the front wall, the top wall, the left side wall and the right side wall of the second cover section.

14. The vehicle cover of claim 1, wherein the at least first cover section further includes:
   a first portion disposed rearwardly of the front wall, the first portion having a first height and a first width;
   a second portion disposed rearwardly of the first portion, the second portion having a second height being greater than the first height and a second width being greater than the first width;
   a third portion disposed rearwardly of the second portion, the third portion having a third height being less than the second height and a third width being less than the second width; and
   a first half of a non-permanent fastener disposed rearwardly of the third portion, and
each of the at least two second cover sections further includes:
   a second half of the non-permanent fastener;
   a fourth portion disposed rearwardly of the second half of the non-permanent fastener, the fourth portion having a fourth height being substantially equal to the third height and a fourth width being less than the third width; and
the first cover section being non-permanently connected to either one of the at least two second cover sections by connecting the first half of the non-permanent fastener to the second half of the non-permanent fastener, thereby forming the corresponding one of the first and second cover,
the third portion and the fourth portion together defining a seat portion adapted to cover a seat of a corresponding one of the first and second vehicle.

* * * * *

UNITED STATES PATENT AND TRADEMARK OFFICE
CERTIFICATE OF CORRECTION

| | | |
|---|---|---|
| PATENT NO. | : 8,075,045 B2 | Page 1 of 1 |
| APPLICATION NO. | : 12/163370 | |
| DATED | : December 13, 2011 | |
| INVENTOR(S) | : Guillaume Auger | |

It is certified that error appears in the above-identified patent and that said Letters Patent is hereby corrected as shown below:

In Col. 13, Claim 1, at line 40-41: should read -- the right side wall having a rearward edge; --

In Col. 15, Claim 10, at line 57: should read -- rearward edge; --

In Col. 16, Claim 12, should read
at line 46: -- wall having a forward edge --
at line 54: -- between the first cover section --

Signed and Sealed this
Thirteenth Day of March, 2012

David J. Kappos
*Director of the United States Patent and Trademark Office*